United States Patent
Takabayashi et al.

(10) Patent No.: US 11,971,579 B2
(45) Date of Patent: Apr. 30, 2024

(54) MULTI-MODE INTERFEROMETRIC OPTICAL WAVEGUIDE DEVICE AND PHOTONIC INTEGRATED CIRCUIT

(71) Applicant: Mitsubishi Electric Corporation, Tokyo (JP)

(72) Inventors: Masakazu Takabayashi, Tokyo (JP); Kenichi Abe, Tokyo (JP); Satoshi Nishikawa, Tokyo (JP); Koichi Akiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 500 days.

(21) Appl. No.: 17/274,468

(22) PCT Filed: Oct. 10, 2018

(86) PCT No.: PCT/JP2018/037685
§ 371 (c)(1),
(2) Date: Mar. 9, 2021

(87) PCT Pub. No.: WO2020/075234
PCT Pub. Date: Apr. 16, 2020

(65) Prior Publication Data
US 2022/0050350 A1    Feb. 17, 2022

(51) Int. Cl.
*G02B 6/28*    (2006.01)
*G02B 6/125*    (2006.01)
(Continued)

(52) U.S. Cl.
CPC ........... *G02B 6/2813* (2013.01); *G02B 6/125* (2013.01); *G02B 6/2817* (2013.01);
(Continued)

(58) Field of Classification Search
CPC .............................. G02B 6/125; G02B 6/2813
See application file for complete search history.

(56) References Cited

U.S. PATENT DOCUMENTS 4,087,159 A * 5/1978 Ulrich ................ G02B 27/0994
385/115
6,421,482 B1    7/2002 Augustsson
(Continued)

FOREIGN PATENT DOCUMENTS

CN    201000498 Y *    1/2008
JP    4-346301 A    12/1992
(Continued)

OTHER PUBLICATIONS

English machine translation of written description of JP 2000-137128 A, retrieved from EPO on Jul. 21, 2023. (Year: 2023).*
(Continued)

*Primary Examiner* — Michael Stahl
(74) *Attorney, Agent, or Firm* — XSENSUS LLP

(57) ABSTRACT

A multi-mode interferometric optical waveguide device includes: a multi-mode interferometric optical waveguide which includes a first reflective surface; a first single-mode waveguide connected to the multi-mode interferometric optical waveguide; and a second single-mode waveguide connected to the multi-mode interferometric optical waveguide and oppose the first reflective surface. Consequently, the multi-mode interferometric optical waveguide device can propagate light from the first single-mode waveguide to the second single-mode waveguide, with further reduced optical losses.

19 Claims, 13 Drawing Sheets

(51) Int. Cl.
G02B 6/12 (2006.01)
G02F 1/21 (2006.01)
G02F 1/225 (2006.01)

(52) U.S. Cl.
CPC ............ *G02B 2006/12119* (2013.01); *G02B 2006/1215* (2013.01); *G02B 2006/12154* (2013.01); *G02F 1/217* (2021.01); *G02F 1/225* (2013.01)

(56) References Cited

U.S. PATENT DOCUMENTS

| | | |
|---|---|---|
| 7,734,122 B1 | 6/2010 | Mackie |
| 2004/0247235 A1* | 12/2004 | Jenkins ............ G02B 6/12007 385/24 |
| 2004/0252934 A1 | 12/2004 | Jenkins |
| 2005/0036737 A1* | 2/2005 | Stuart ................ G02B 6/122 385/33 |
| 2005/0069258 A1* | 3/2005 | Zheng ................ G02B 6/125 385/45 |
| 2005/0259935 A1 | 11/2005 | Hamada |
| 2012/0057817 A1 | 3/2012 | Wesstrom et al. |
| 2012/0068609 A1 | 3/2012 | Ide et al. |
| 2016/0011370 A1 | 1/2016 | Okayama |
| 2017/0248760 A1* | 8/2017 | Hu ................... G02B 6/12007 |
| 2020/0264369 A1 | 8/2020 | Takabayashi et al. |

FOREIGN PATENT DOCUMENTS

| | | |
|---|---|---|
| JP | 09-258045 A | 10/1997 |
| JP | 2000-137128 A | 5/2000 |
| JP | 2003-84324 A | 3/2003 |
| JP | 2006-323135 A | 11/2006 |
| JP | 2008-65104 A | 3/2008 |
| JP | 2008-241937 A | 10/2008 |
| JP | 2012-527010 A | 11/2012 |
| JP | 5294283 B2 | 9/2013 |
| JP | 6430071 B1 | 11/2018 |

OTHER PUBLICATIONS

English translation of written opinion for PCT/JP2018/037685, dated Apr. 10, 2021. (Year: 2021).*
International Search Report and Written Opinion dated Jan. 8, 2019, received for PCT Application PCT/JP2018/037685, Filed on Oct. 10, 2018, 11 pages including English Translation.
Notice of Reasons for Refusal dated May 7, 2019, received for JP Application 2019-517120, 18 pages including English Translation.
Notice of Reasons for Refusal dated Sep. 24, 2019, received for JP Application 2019-517120, 10 pages including English Translation.
Office Action dated Feb. 11, 2023 in Chinese Patent Application No. 201880098388.X with English translation thereof, 12 pages.
Chinese Office Action dated Jul. 5, 2022, in Chinese Application No. 201880098388.

* cited by examiner

MULTI-MODE INTERFEROMETRIC OPTICAL WAVEGUIDE DEVICE AND PHOTONIC INTEGRATED CIRCUIT

CROSS-REFERENCE TO RELATED APPLICATION

The present application is based on PCT filing PCT/JP2018/037685, filed Oct. 10, 2018, the entire contents of which are incorporated herein by reference.

TECHNICAL FIELD

The present invention relates to a multi-mode interferometric optical waveguide device and a photonic integrated circuit.

BACKGROUND ART

Japanese Patent No. 5294283 (PTL 1) and Japanese Patent Laying-Open No. 2000-137128 (PTL 2) disclose a bent waveguide having a totally reflective mirror formed at a bend.

CITATION LIST

Patent Literature

PTL 1: Japanese Patent No. 5294283
PTL 2: Japanese Patent Laying-Open No. 2000-137128

SUMMARY OF INVENTION

Technical Problem

However, the bent waveguides disclosed in PTL 1 and PTL 2 still cause optical losses at the bend (e.g., see (b) of FIG. 37 of PTL 1). The present invention is made to solve the above problem, and on object of the present invention is to provide a waveguide-type device that has further reduced optical losses.

Solution to Problem

A multi-mode interferometric optical waveguide device according to a first aspect of the present invention includes: a multi-mode interferometric optical waveguide which includes a reflective portion; a first single-mode waveguide; and a second single-mode waveguide. The reflective portion includes a first reflective surface. The multi-mode interferometric optical waveguide is a 1×1 multi-mode interferometric optical waveguide. The multi-mode interferometric optical waveguide has a first end, a second end oppose the first end, a first side connecting the first end and the second end, and a second side oppose the first side. The second side connects the first end and the second end. The first single-mode waveguide is connected to the first end. The first reflective surface is disposed at the second end. The second single-mode waveguide is opposite the first reflective surface and connected to the first side.

A multi-mode interferometric optical waveguide device according to a second aspect of the present invention includes: a multi-mode interferometric optical waveguide which includes a reflective portion; a first single-mode waveguide; a second single-mode waveguide; and a third single-mode waveguide. The reflective portion includes a first reflective surface and a second reflective surface. The multi-mode interferometric optical waveguide has a first end, a second end oppose the first end, a first side connecting the first end and the second end, and a second side oppose the first side. The second side connects the first end and the second end. The first single-mode waveguide is connected to the first end. The first reflective surface is disposed at a first portion of the second end proximal to the first side. The second reflective surface is disposed at a second portion of the second end proximal to the second side. The second single-mode waveguide is opposite the first reflective surface and connected to the first side. The third single-mode waveguide is opposite the second reflective surface and connected to the second side.

A multi-mode interferometric optical waveguide device according to a third aspect of the present invention includes: a multi-mode interferometric optical waveguide which includes a reflective portion; a first single-mode waveguide; and a second single-mode waveguide. The reflective portion includes a first reflective surface and a second reflective surface. The multi-mode interferometric optical waveguide has a first end, a second end oppose the first end, a first side connecting the first end and the second end, a second side opposite the first side. The second side connects the first end and the second end. The first reflective surface is disposed a second end. The second reflective surface is disposed at the first end. The first single-mode waveguide is connected to the first side and opposite the second reflective surface. The second single-mode waveguide is connected to the first side and opposite the first reflective surface.

Advantageous Effects of Invention

In the multi-mode interferometric optical waveguide device according to the first aspect of the present invention, the multi-mode interferometric optical waveguide causes the light entered through the first single-mode waveguide to be reflected off of the first reflective surface, and self-imaged in the second single-mode waveguide. Since the second single-mode waveguide is opposite the first reflective surface, the first reflective surface reflects light into the second single-mode waveguide, without substantially disturbing the interference of the light in the multi-mode interferometric optical waveguide. Consequently, according to the multi-mode interferometric optical waveguide device of the first aspect of the present invention, optical losses can be further reduced.

In the multi-mode interferometric optical waveguide device according to the second aspect of the present invention, the multi-mode interferometric optical waveguide causes the light entered through the first single-mode waveguide to be self-imaged in the second single-mode waveguide and the third single-mode waveguide. Since the second single-mode waveguide is opposite the first reflective surface, and the third single-mode waveguide is opposite the second reflective surface, the first reflective surface and the second reflective surface reflect light into the second single-mode waveguide and the third single-mode waveguide, without substantially disturbing the interference of the light in the multi-mode interferometric optical waveguide. Consequently, according to the multi-mode interferometric optical waveguide device of the second aspect of the present invention, optical losses can be further reduced.

In the multi-mode interferometric optical waveguide device according to the third aspect of the present invention, the multi-mode interferometric optical waveguide causes the light entered through the first single-mode waveguide to be reflected off of the first reflective surface and the second reflective surface, and self-imaged in the second single-mode waveguide. Since the first single-mode waveguide is opposite the second reflective surface, and the second single-mode waveguide is opposite the first reflective surface, the first reflective surface and the second reflective surface reflect light into the second single-mode waveguide, without substantially disturbing the interference of the light in the multi-mode interferometric optical waveguide. Consequently, according to the multi-mode interferometric optical waveguide device of the third aspect of the present invention, optical losses can be further reduced.

DESCRIPTION OF EMBODIMENTS

Hereinafter, embodiments according to the present invention will be described. Note that like reference number refers to like configurations, and description thereof will not be repeated.

Embodiment 1

Figure 1:
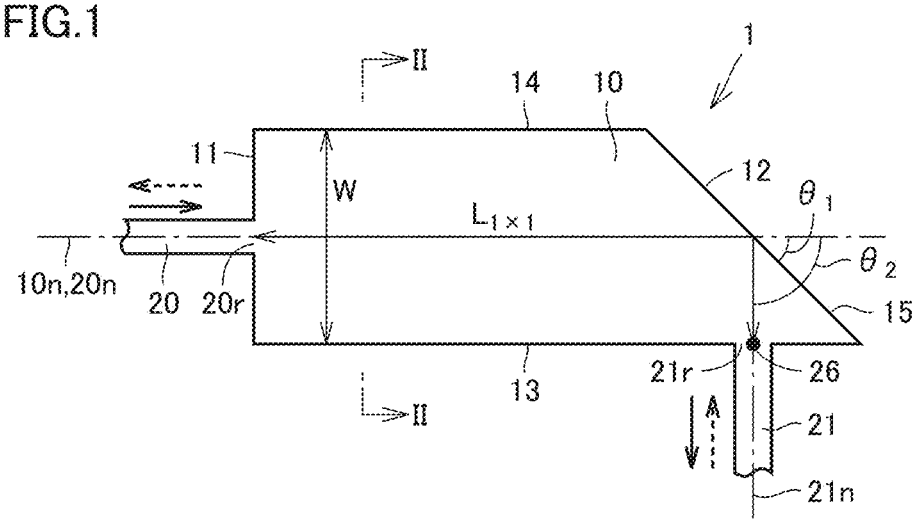
FIG. 1 is a schematic plan view of a multi-mode interferometric optical waveguide device according to Embodiment 1.
Figure 2:
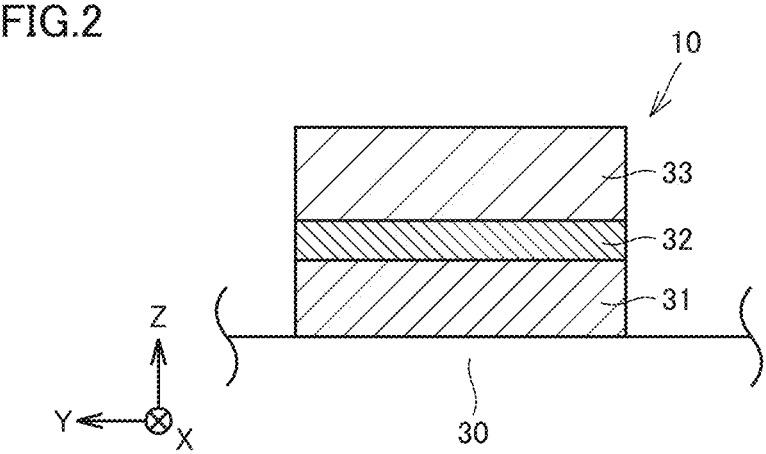
FIG. 2 is an enlarged schematic partial cross-sectional view of the multi-mode interferometric optical waveguide device according to Embodiment 1, taken along section line II-II of FIG. 1.
Figure 3:
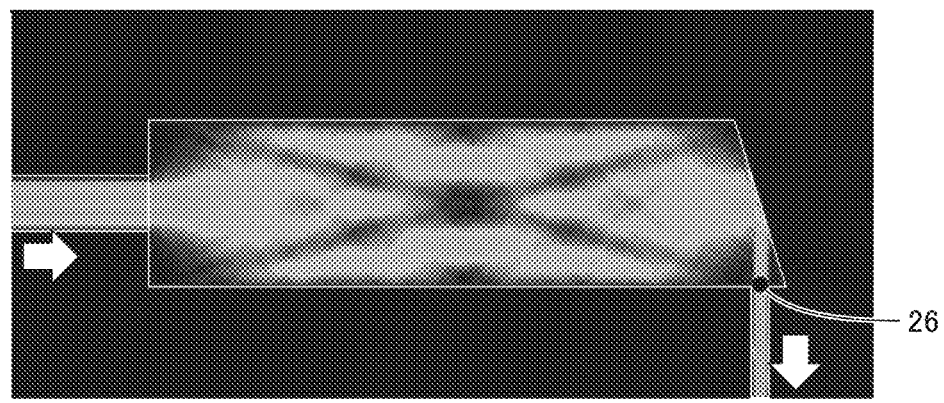
FIG. 3 is a diagram showing a result of simulation of propagation of light in the multi-mode interferometric optical waveguide device according to Embodiment 1.

Referring to FIGS. 1 to 3, a multi-mode interferometric optical waveguide device 1 according to Embodiment 1 is now described. Multi-mode interferometric optical waveguide device 1 includes a multi-mode interferometric optical waveguide 10, a first single-mode waveguide 20, and a second single-mode waveguide 21.

Multi-mode interferometric optical waveguide 10 has a first end 11, a second end 12 opposite the first end 11, a first side 13 connecting first end 11 and second end 12, and a second side 14 opposite the first side 13. Second side 14 connects first end 11 and second end 12. First end 11 is a longitudinal end of multi-mode interferometric optical waveguide 10. Second end 12 is a longitudinal end of multi-mode interferometric optical waveguide 10.

Second end 12 is inclined with respect to first end 11. Specifically, second end 12 is inclined with respect to a centerline $10n$ of multi-mode interferometric optical waveguide 10 in a manner that the distance between first end 11 and second end 12 increases toward first side 13 and the distance between first end 11 and second end 12 decreases toward second side 14. Centerline $10n$ of multi-mode interferometric optical waveguide 10 is positioned halfway between first side 13 and second side 14, extending in the longitudinal direction of multi-mode interferometric optical waveguide 10.

First side 13 is an end of multi-mode interferometric optical waveguide 10 in the width direction. Second side 14 is an end of multi-mode interferometric optical waveguide 10 in the width direction. Multi-mode interferometric optical waveguide 10 has a width W. Width W is a length between first side 13 and second side 14. First side 13 may be in parallel with second side 14. First side 13 is, for example, perpendicular to first end 11. Second side 14 is, for example, perpendicular to first end 11.

Multi-mode interferometric optical waveguide 10 includes a reflective portion. The reflective portion includes a first reflective surface 15. First reflective surface 15 is disposed at second end 12. First reflective surface 15 may extend across the second end 12. First reflective surface 15 is inclined by a first angle $\theta_1$ with respect to centerline $10n$ of multi-mode interferometric optical waveguide 10. First angle $\theta_1$ is an angle formed between centerline $10n$ of multi-mode interferometric optical waveguide 10 and first reflective surface 15. In one example, first angle $\theta_1$ is 45 degrees. First reflective surface 15 is inclined with respect to centerline 10n of multi-mode interferometric optical waveguide 10 in a manner that the distance between first end 11 and first reflective surface 15 increases toward first side 13 and the distance between first end 11 and first reflective surface 15 decreases toward second side 14.

First single-mode waveguide 20 is connected to multi-mode interferometric optical waveguide 10 at a first connecting portion 20r. First connecting portion 20r is a boundary between first single-mode waveguide 20 and multi-mode interferometric optical waveguide 10. First single-mode waveguide 20 is connected to first end 11. First single-mode waveguide 20 has a first centerline 20n in parallel with centerline 10n of multi-mode interferometric optical waveguide 10. First centerline 20n of first single-mode waveguide 20 coincides with centerline 10n of multi-mode interferometric optical waveguide 10. First connecting portion 20r is on centerline 10n of multi-mode interferometric optical waveguide 10.

Second single-mode waveguide 21 is connected to multi-mode interferometric optical waveguide 10 at a second connecting portion 21r. Second connecting portion 21r is a boundary between second single-mode waveguide 21 and multi-mode interferometric optical waveguide 10. Second single-mode waveguide 21 is connected to first side 13. Particularly, second single-mode waveguide 21 is connected to a portion of first side 13 proximal to second end 12.

Second single-mode waveguide 21 is opposite the first reflective surface 15. Second single-mode waveguide 21 has a second centerline 21n that is not in parallel with centerline 10n of multi-mode interferometric optical waveguide 10. Second centerline 21n of second single-mode waveguide 21 is inclined by a second angle $\theta_2$ with respect to centerline 10n of multi-mode interferometric optical waveguide 10. Second angle $\theta_2$ is an angle formed between centerline 10n of multi-mode interferometric optical waveguide 10 and second centerline 21n of second single-mode waveguide 21. Second angle $\theta_2$ is substantially twice the first angle $\theta_1$. As used herein, second angle $\theta_2$ being substantially twice the first angle $\theta_1$ means that second angle $\theta_2$ is 1.9 times or greater and 2.1 or less than the first angle $\theta_1$. In one example, second angle $\theta_2$ is 90 degrees.

As shown in FIG. 2, multi-mode interferometric optical waveguide 10 is formed on a substrate 30. Multi-mode interferometric optical waveguide 10 includes a first clad layer 31, a core layer 32, and a second clad layer 33. First clad layer 31 is formed on substrate 30. Core layer 32 is formed on first clad layer 31. Second clad layer 33 is formed on core layer 32. Core layer 32 is sandwiched between first clad layer 31 and second clad layer 33. First single-mode waveguide 20 and second single-mode waveguide 21 have a cross-sectional structure similar to multi-mode interferometric optical waveguide 10, except for waveguide width. Substrate 30 is a semiconductor substrate, such as an InP substrate, for example. First clad layer 31 and second clad layer 33 are semiconducting layers, such as an InP layer, for example. Core layer 32 is, for example, a bulk semiconducting layer or multi-quantum well (MQW) layer which includes an InGaAsP-based material. Multi-mode interferometric optical waveguide device 1 is, for example, a semiconductor optical waveguide device.

Multi-mode interferometric optical waveguide 10 according to the present embodiment is a one-input one-output multi-mode interferometric optical waveguide (1×1 MMI). Multi-mode interferometric optical waveguide 10 is configured to cause a first light entered through the first single-mode waveguide 20 to be self-imaged in second single-mode waveguide 21 (e.g., second connecting portion 21r).

As used herein, multi-mode interferometric optical waveguide 10 causing light to be self-imaged in a single-mode waveguide means multi-mode interferometric optical waveguide 10 causing self-imaging of light and outputting the self-imaged light into the single-mode waveguide. A first image forming portion 26 for the first light is located at second connecting portion 21r, for example.

For example, if multi-mode interferometric optical waveguide 10 is a ridged waveguide, a multi-mode waveguide length $L_{1\times1}$ of multi-mode interferometric optical waveguide 10 is given by Equation (1):

$$L_{1\times 1}=n_{eff}W^2/\lambda \quad (1)$$

where, W represents the width of multi-mode interferometric optical waveguide 10, $n_{eff}$ represents an equivalent refractive index of multi-mode interferometric optical waveguide 10, and $\lambda$ represents a wavelength of the first light.

Multi-mode interferometric optical waveguide device 1 according to the present embodiment yields the following advantageous effects:

Multi-mode interferometric optical waveguide device 1 includes: multi-mode interferometric optical waveguide 10 which includes the reflective portion; first single-mode waveguide 20; and second single-mode waveguide 21. The reflective portion includes first reflective surface 15. Multi-mode interferometric optical waveguide 10 is a 1×1 multi-mode interferometric optical waveguide. Multi-mode interferometric optical waveguide 10 has first end 11, second end 12 opposite the first end 11, first side 13 connecting first end 11 and second end 12, and second side 14 opposite the first side 13. Second side 14 connects first end 11 and second end 12. First single-mode waveguide 20 is connected to first end 11. The first reflective surface 15 is disposed at second end 12. Second single-mode waveguide 21 is opposite the first reflective surface 15, and connected to first side 13.

The first light, such as signal light, enters multi-mode interferometric optical waveguide 10 through first single-mode waveguide 20. Multi-mode interferometric optical waveguide 10 causes the first light to be reflected off of first reflective surface 15, and self-imaged in second single-mode waveguide 21 (e.g., second connecting portion 21r). Since second single-mode waveguide 21 is opposite the first reflective surface 15, if the spreading of the first light is small, the first light is reflected off of first reflective surface 15, as shown in FIG. 3. First reflective surface 15 reflects the first light into second single-mode waveguide 21, without substantially disturbing the interference of the first light in multi-mode interferometric optical waveguide 10. Consequently, multi-mode interferometric optical waveguide device 1 can propagate the first light from first single-mode waveguide 20 to second single-mode waveguide 21 with low losses. Multi-mode interferometric optical waveguide device 1 can change (e.g., bend 90 degrees) the direction of travel of the first light with low losses.

In multi-mode interferometric optical waveguide device 1 according to the present embodiment, second angle $\theta_2$ is substantially twice the first angle $\theta_1$. First angle $\theta_1$ is an angle formed between first reflective surface 15 and centerline 10n of multi-mode interferometric optical waveguide 10 extending along the longitudinal direction of multi-mode interferometric optical waveguide 10. Second angle $\theta_2$ is an angle formed between centerline 10n of multi-mode interferometric optical waveguide 10 and second centerline 21n of second single-mode waveguide 21. Consequently, the first light propagating through multi-mode interferometric optical waveguide 10 couples into second single-mode waveguide 21 with high efficiency. Multi-mode interferometric optical waveguide device 1 can propagate the first light from first single-mode waveguide 20 to second single-mode waveguide 21 with low losses.

While the description has been given mainly for the case where first single-mode waveguide 20 serves as an input optical waveguide and second single-mode waveguide 21 serves as an output optical waveguide, it should be noted that second single-mode waveguide 21 can serves as an input optical waveguide and first single-mode waveguide 20 can serve as an output optical waveguide. In other words, multi-mode interferometric optical waveguide device 1 can cause the light entered through the second single-mode waveguide 21 to be self-imaged in first single-mode waveguide 20 (e.g., first connecting portion 20r), and allow combined light to exit the first single-mode waveguide 20 with low losses.

Embodiment 2

Figure 4:
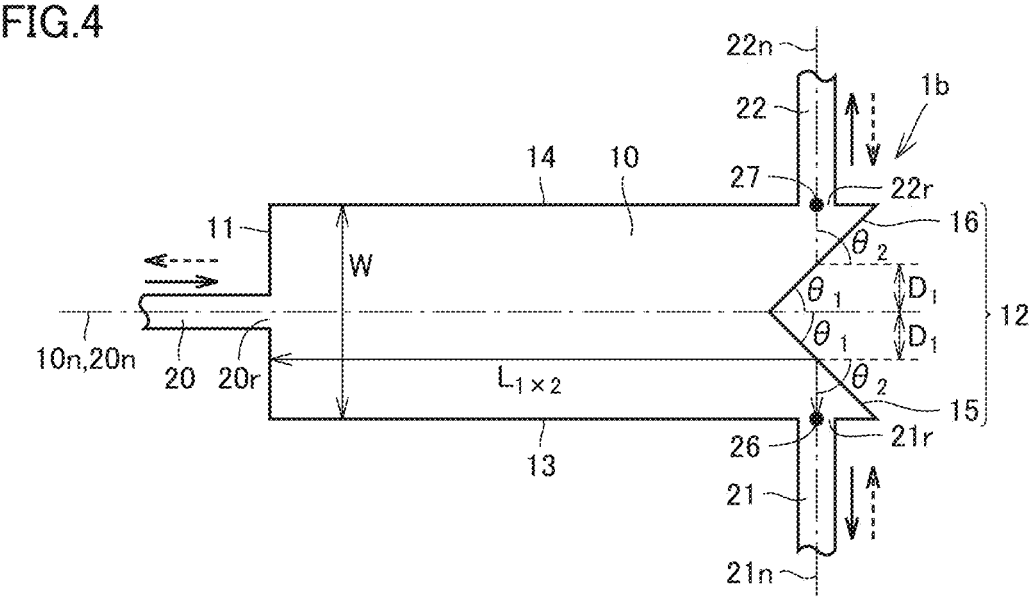
FIG. 4 is a schematic plan view of a multi-mode interferometric optical waveguide device according to Embodiment 2.
Figure 5:
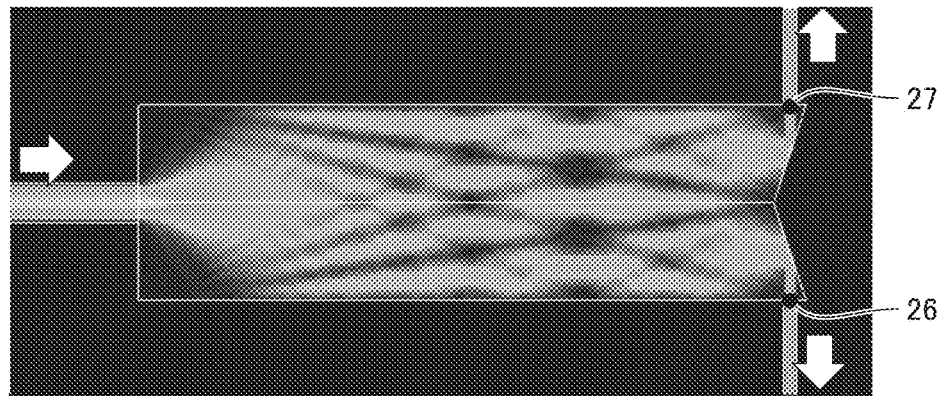
FIG. 5 is a diagram showing a result of simulation of propagation of light in the multi-mode interferometric optical waveguide device according to Embodiment 2.

Referring to FIGS. 4 and 5, a multi-mode interferometric optical waveguide device 1b according to Embodiment 2 is now described. Multi-mode interferometric optical waveguide device 1b according to the present embodiment has a configuration similar to multi-mode interferometric optical waveguide device 1 according to Embodiment 1, and mainly differs in the following respect:

In the present embodiment, a first reflective surface 15 is disposed at a first portion of a second end 12 proximal to a first side 13. First reflective surface 15 is inclined by a first angle $\theta_1$ with respect to a centerline 10n of a multi-mode interferometric optical waveguide 10. First reflective surface 15 is inclined with respect to centerline 10n of multi-mode interferometric optical waveguide 10 in a manner that the distance between a first end 11 and first reflective surface 15 increases toward first side 13 and the distance between first end 11 and first reflective surface 15 decreases toward centerline 10n of multi-mode interferometric optical waveguide 10.

The reflective portion further includes a second reflective surface 16. Second reflective surface 16 is disposed at a second portion of second end 12 proximal to a second side 14. Second reflective surface 16 is inclined by first angle $\theta_1$ with respect to centerline 10n of multi-mode interferometric optical waveguide 10, in a direction opposite the first reflective surface 15. Second reflective surface 16 is inclined with respect to centerline 10n of multi-mode interferometric optical waveguide 10 in a manner that the distance between first end 11 and second reflective surface 16 increases toward second side 14 and the distance between first end 11 and second reflective surface 16 decreases toward centerline 10n of multi-mode interferometric optical waveguide 10.

Multi-mode interferometric optical waveguide device 1b further includes a third single-mode waveguide 22. Third single-mode waveguide 22 is connected to multi-mode interferometric optical waveguide 10 at a third connecting portion 22r. Third connecting portion 22r is a boundary between second single-mode waveguide 21 and multi-mode interferometric optical waveguide 10. Third single-mode waveguide 22 is connected to second side 14. Particularly, third single-mode waveguide 22 is connected to a portion of second side 14 proximal to second end 12. Third single-mode waveguide 22 is opposite the second reflective surface 16. Third single-mode waveguide 22 has a third centerline 22n that is not in parallel with centerline 10n of multi-mode interferometric optical waveguide 10. Third centerline 22n of third single-mode waveguide 22 is inclined by a second angle $\theta_2$ with respect to centerline 10n of multi-mode interferometric optical waveguide 10, in a direction opposite the second single-mode waveguide 21.

Multi-mode interferometric optical waveguide 10 according to the present embodiment is a single-input two-output multi-mode interferometric optical waveguide (1×2 MMI). Multi-mode interferometric optical waveguide 10 is configured to cause the first light entered through the first single-mode waveguide 20 to be self-imaged in second single-mode waveguide 21 (e.g., second connecting portion 21r) and third single-mode waveguide 22 (e.g., third connecting portion 22r). First image forming portion 26 for the first light is located, for example, at second connecting portion 21r, and a second image forming portion 27 for the first light is located at, for example, third connecting portion 22r.

For example, if multi-mode interferometric optical waveguide 10 is a ridged waveguide, a multi-mode waveguide length $L_{1\times2}$ of multi-mode interferometric optical waveguide 10 is given by Equation (2):

$$L_{1\times2} = n_{eff} W^2 / 2\lambda \qquad (2)$$

A first distance $D_1$ is given by W/4. First distance $D_1$ is a distance from a centerline 10n of multi-mode interferometric optical waveguide 10 to a point of connection between a second centerline 21n of second single-mode waveguide 21 and first reflective surface 15. First distance $D_1$ is a distance from centerline 10n of multi-mode interferometric optical waveguide 10 to a point of connection between third centerline 22n of third single-mode waveguide 22 to second reflective surface 16.

Multi-mode interferometric optical waveguide device 1b according to the present embodiment yields the following advantageous effects:

Multi-mode interferometric optical waveguide device 1b includes: a multi-mode interferometric optical waveguide which includes a reflective portion; first single-mode waveguide 20; second single-mode waveguide 21; and third single-mode waveguide 22. The reflective portion includes first reflective surface 15 and second reflective surface 16. Multi-mode interferometric optical waveguide 10 has first end 11, second end 12 opposite the first end 11, first side 13 connecting first end 11 and second end 12, and second side 14 opposite the first side 13. Second side 14 connects first end 11 and second end 12. First single-mode waveguide 20 is connected to first end 11. First reflective surface 15 is disposed at the first portion of second end 12 proximal to first side 13. Second reflective surface 16 is disposed at the second portion of second end 12 proximal to second side 14. Second single-mode waveguide 21 is opposite the first reflective surface 15, and connected to first side 13. Third single-mode waveguide 22 is opposite the second reflective surface 16, and connected to second side 14.

The first light, such as signal light, enters multi-mode interferometric optical waveguide 10 through first single-mode waveguide 20. Multi-mode interferometric optical waveguide 10 causes the first light to be reflected off of first reflective surface 15 and second reflective surface 16, and self-imaged in second single-mode waveguide 21 (e.g., second connecting portion 21r) and third single-mode waveguide 22 (e.g., third connecting portion 22r). Since second single-mode waveguide 21 is opposite the first reflective surface 15, if the spreading of the first light is small, the first light is reflected off of first reflective surface 15, as shown in FIG. 5. Since third single-mode waveguide 22 is opposite the second reflective surface 16, if the spreading of the first light is small, the first light is reflected off of second reflective surface 16, as shown in FIG. 5. First reflective surface 15 and second reflective surface 16 reflect the first light into second single-mode waveguide 21 and third single-mode waveguide 22, without substantially disturbing the interference of the first light in multi-mode interferometric optical waveguide 10. Consequently, multi-mode interferometric optical waveguide device 1b can change (e.g., bend 90 degrees) the direction of travel of the first light with low losses, and split the first light.

While the description has been given mainly for the case where first single-mode waveguide 20 serves as an input optical waveguide, second single-mode waveguide 21 and third single-mode waveguide 22 serve as an output optical waveguide, and multi-mode interferometric optical waveguide device 1b serves as a waveguide-type optical demultiplexer, second single-mode waveguide 21 and third single-mode waveguide 22 can serve as an input optical waveguide, first single-mode waveguide 20 can serve as an output optical waveguide, and multi-mode interferometric optical waveguide device 1b can serve as a waveguide-type optical multiplexer. In other words, multi-mode interferometric optical waveguide device 1b can cause the light entered through second single-mode waveguide 21 and the light entered through the third single-mode waveguide 22 to be self-imaged in first single-mode waveguide 20 (e.g., first connecting portion 20r), and allows combined light to exit the first single-mode waveguide 20 with low losses.

Embodiment 3

Figure 6:
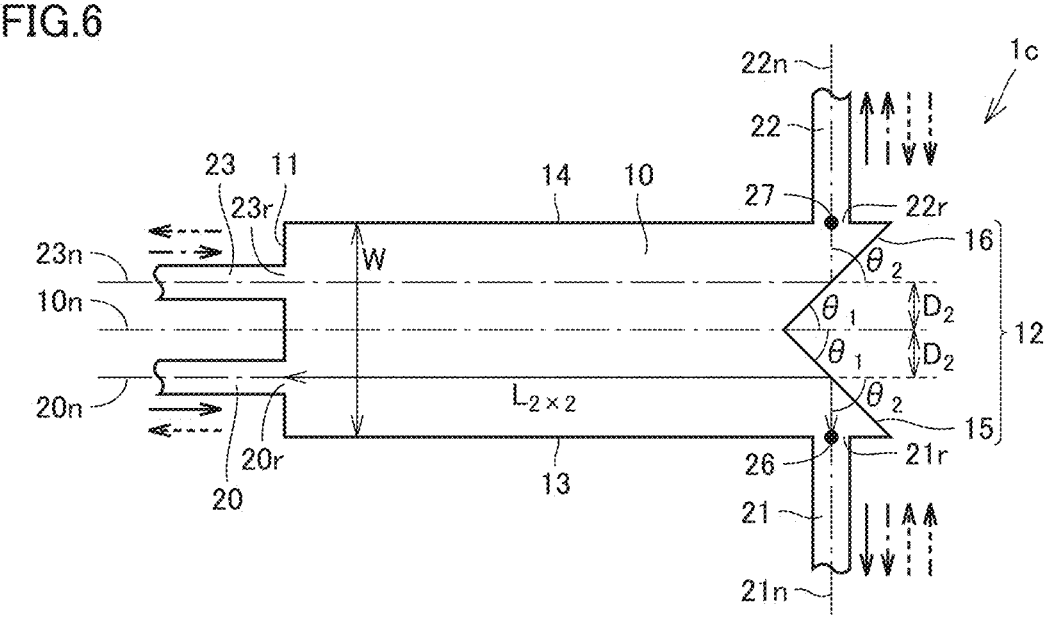
FIG. 6 is a schematic plan view of a multi-mode interferometric optical waveguide device according to Embodiment 3.
Figure 7:
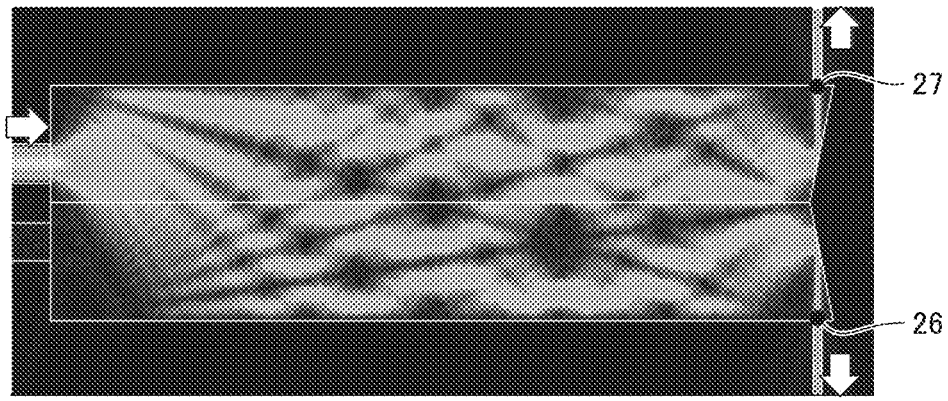
FIG. 7 is a diagram showing a result of simulation of propagation of light in the multi-mode interferometric optical waveguide device according to Embodiment 3.

Referring to FIGS. 6 and 7, a multi-mode interferometric optical waveguide device 1c according to Embodiment 3 is now described. Multi-mode interferometric optical waveguide device 1c according to the present embodiment has a configuration similar to multi-mode interferometric optical waveguide device 1b according to Embodiment 2, and mainly differs in the following respect:

In the present embodiment, a first single-mode waveguide 20 is connected to a third portion of a first end 11 proximal to a first side 13.

Multi-mode interferometric optical waveguide device 1c further includes a fourth single-mode waveguide 23. Fourth single-mode waveguide 23 is connected to a multi-mode interferometric optical waveguide 10 at a fourth connecting portion 23r. Fourth connecting portion 23r is a boundary between fourth single-mode waveguide 23 and multi-mode interferometric optical waveguide 10. Fourth single-mode waveguide 23 is connected to a fourth portion of first end 11 proximal to a second side 14.

Multi-mode interferometric optical waveguide 10 according to the present embodiment is a two-input two-output multi-mode interferometric optical waveguide (2×2 MMI). Multi-mode interferometric optical waveguide 10 is configured to cause first light entered the first single-mode waveguide 20 to be self-imaged in a second single-mode waveguide 21 (e.g., second connecting portion 21r) and a third single-mode waveguide 22 (e.g., third connecting portion 22r). A first image forming portion 26 for the first light is located at, for example, second connecting portion 21r, and a second image forming portion 27 for the first light is located at, for example, third connecting portion 22r. Multi-mode interferometric optical waveguide 10 is configured to cause second light entered through the fourth single-mode waveguide 23 to be self-imaged in second single-mode waveguide 21 (e.g., second connecting portion 21r) and third single-mode waveguide 22 (e.g., third connecting portion 22r). First image forming portion 26 for the second light is located at, for example, second connecting portion 21r, and second image forming portion 27 for the second light is located at, for example, third connecting portion 22r.

For example, if multi-mode interferometric optical waveguide 10 is a ridged waveguide, a multi-mode waveguide length $L_{2\times2}$ of multi-mode interferometric optical waveguide 10 is given by Equation (3):

$$L_{2\times2}=2n_{eff}W^2/3\lambda \qquad (3)$$

A second distance $D_2$ is given by W/6. Second distance $D_2$ is a distance from a centerline 10n of multi-mode interferometric optical waveguide 10 to first centerline 20n of first single-mode waveguide 20. Second distance $D_2$ is a distance from centerline 10n of multi-mode interferometric optical waveguide 10 to a point of connection between a second centerline 21n of second single-mode waveguide 21 to first reflective surface 15. Second distance $D_2$ is a distance from centerline 10n of multi-mode interferometric optical waveguide 10 to a fourth centerline 23n of fourth single-mode waveguide 23. Second distance $D_2$ is a distance from centerline 10n of multi-mode interferometric optical waveguide 10 to a point of connection between third centerline 22n of third single-mode waveguide 22 and second reflective surface 16.

Multi-mode interferometric optical waveguide device 1c according to the present embodiment yields the following advantageous effects, in addition to the advantageous effects of multi-mode interferometric optical waveguide device 1b according to Embodiment 2.

Multi-mode interferometric optical waveguide device 1c further includes fourth single-mode waveguide 23. First single-mode waveguide 20 is connected to a third portion of first end 11 proximal to first side 13. Fourth single-mode waveguide 23 is connected to the fourth portion of first end 11 proximal to second side 14.

The second light, such as signal light, enters the multi-mode interferometric optical waveguide 10 through fourth single-mode waveguide 23. Multi-mode interferometric optical waveguide 10 causes the second light to be reflected off of first reflective surface 15 and second reflective surface 16, and self-imaged in second single-mode waveguide 21 (e.g., second connecting portion 21r) and third single-mode waveguide 22 (e.g., third connecting portion 22r). Since second single-mode waveguide 21 is opposite the first reflective surface 15, if the spreading of the second light is small, the second light is reflected off of first reflective surface 15. Since third single-mode waveguide 22 is opposite the second reflective surface 16, if the spreading of the second light is small, the second light is reflected off of second reflective surface 16. First reflective surface 15 and second reflective surface 16 reflect the second light into second single-mode waveguide 21 and third single-mode waveguide 22, without substantially disturbing the interference of the second light in multi-mode interferometric optical waveguide 10. Consequently, multi-mode interferometric optical waveguide device 1c can change (e.g., bend 90 degrees) the direction of travel of the second light, and branches, and split the second light.

While the description has been given mainly for the case where first single-mode waveguide 20 or fourth single-mode waveguide 23 serves as an input optical waveguide, second single-mode waveguide 21 and third single-mode waveguide 22 serve as an output optical waveguide, and multi-mode interferometric optical waveguide device 1c serves as a waveguide-type optical demultiplexer, second single-mode waveguide 21 and third single-mode waveguide 22 can serve as an input optical waveguide, first single-mode waveguide 20 or fourth single-mode waveguide 23 can serve as an output optical waveguide, and multi-mode interferometric optical waveguide device 1c can serve as a waveguide-type optical multiplexer.

In other words, if the phase difference between third light entered through the second single-mode waveguide 21 and fourth light entered through the third single-mode waveguide 22 is a first phase difference, multi-mode interferometric optical waveguide device 1c can cause the third light and the fourth light to be self-imaged in first single-mode waveguide 20 (e.g., first connecting portion 20r), and allow combined light to exit the first single-mode waveguide 20 with low losses. If the phase difference between the third light entered through the second single-mode waveguide 21 and the fourth light entered through the third single-mode waveguide 22 is a second phase difference (the second phase difference is different from the first phase difference), multi-mode interferometric optical waveguide device 1c can cause the third light and the fourth light to be self-imaged in fourth single-mode waveguide 23 (e.g., fourth connecting portion 23r), and allow combined light to exit the fourth single-mode waveguide 23 with low losses.

Embodiment 4

Figure 8:
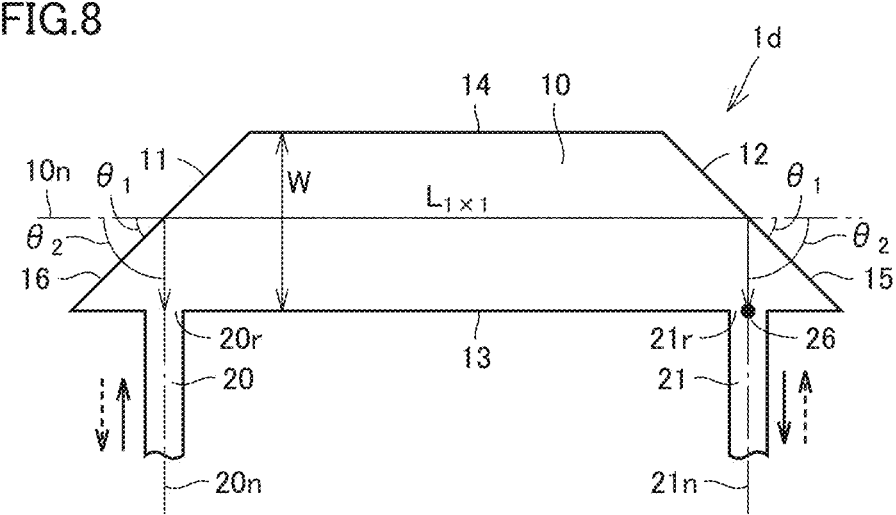
FIG. 8 is a schematic plan view of a multi-mode interferometric optical waveguide device according to Embodiment 4.

Referring to FIG. 8, a multi-mode interferometric optical waveguide device 1d according to Embodiment 4 is now described. Multi-mode interferometric optical waveguide device 1d according to the present embodiment has a configuration similar to multi-mode interferometric optical waveguide device 1 according to Embodiment 1, and mainly differs in the following respect:

In the present embodiment, the reflective portion of multi-mode interferometric optical waveguide 10 further includes a second reflective surface 16. Second reflective surface 16 is disposed at a first end 11. Particularly, second reflective surface 16 may extend across the first end 11. Second reflective surface 16 is inclined by a first angle $\theta_1$ with respect to a centerline 10n of multi-mode interferometric optical waveguide 10, in a direction opposite the first reflective surface 15. In one example, first angle $\theta_1$ is 45 degrees. Second reflective surface 16 is inclined with respect to centerline 10n of multi-mode interferometric optical waveguide 10 in a manner that the distance between a second end 12 and second reflective surface 16 increases toward a first side 13 and the distance between second end 12 and second reflective surface 16 decreases toward a second side 14.

A first single-mode waveguide 20 is connected to first side 13. Particularly, first single-mode waveguide 20 is connected to a portion of first side 13 proximal to first end 11. First single-mode waveguide 20 is opposite the second reflective surface 16. First single-mode waveguide 20 has a first centerline 20n that is not in parallel with centerline 10n of multi-mode interferometric optical waveguide 10. First centerline 20n of first single-mode waveguide 20 is inclined by a second angle $\theta_2$ with respect to centerline 10n of multi-mode interferometric optical waveguide 10, in a direction opposite the second single-mode waveguide 21. Second angle $\theta_2$ is twice the first angle $\theta_1$. In one example, second angle $\theta_2$ is 90 degrees.

Multi-mode interferometric optical waveguide 10 according to the present embodiment is a one-input one-output multi-mode interferometric optical waveguide (1×1 MMI). Multi-mode interferometric optical waveguide 10 is configured to cause the first light entered through the first single-mode waveguide 20 to be self-imaged in second single-mode waveguide 21 (e.g., second connecting portion 21r). A first image forming portion 26 for the first light is located at, for example, second connecting portion 21r.

For example, if multi-mode interferometric optical waveguide 10 is a ridged waveguide, a multi-mode waveguide length $L_{1\times1}$ of multi-mode interferometric optical waveguide 10 is given by Equation (1) stated above.

Multi-mode interferometric optical waveguide device 1d according to the present embodiment yields the same advantageous effects as multi-mode interferometric optical waveguide device 1 according to Embodiment 1, as follows:

Multi-mode interferometric optical waveguide device 1d includes: multi-mode interferometric optical waveguide 10 which includes a reflective portion; first single-mode waveguide 20; and second single-mode waveguide 21. The reflective portion includes first reflective surface 15 and second reflective surface 16. Multi-mode interferometric optical waveguide 10 has first end 11, second end 12 opposite the first end 11, first side 13 connecting first end 11 and second end 12, and second side 14 opposite the first side 13. Second side 14 connects first end 11 and second end 12. First reflective surface 15 is disposed at second end 12. Second reflective surface 16 is disposed at first end 11. First single-mode waveguide 20 is connected to first side 13, and oppose the second reflective surface 16. Second single-mode waveguide 21 is connected to first side 13, and oppose the first reflective surface 15.

The first light, such as signal light, enters the multi-mode interferometric optical waveguide 10 through first single-mode waveguide 20. Multi-mode interferometric optical waveguide 10 causes the first light to be reflected off of first reflective surface 15 and second reflective surface 16, and self-imaged in second single-mode waveguide 21 (e.g., second connecting portion 21r). Since first single-mode waveguide 20 is opposite the second reflective surface 16, if the spreading of the first light is small, the first light is reflected off of second reflective surface 16. Since second single-mode waveguide 21 is opposite the first reflective surface 15, if the spreading of the first light is small, the first light is reflected by first reflective surface 15. First reflective surface 15 and second reflective surface 16 reflect the first light into second single-mode waveguide 21, without substantially disturbing the interference of the first light in multi-mode interferometric optical waveguide 10. Consequently, multi-mode interferometric optical waveguide device 1d can bend back the direction of travel of the first light with low losses.

While the description has been given mainly for the case where first single-mode waveguide 20 serves as an input optical waveguide, and second single-mode waveguide 21 serves as an output optical waveguide, it should be noted that second single-mode waveguide 21 can serve as an input optical waveguide, and first single-mode waveguide 20 can serve as an output optical waveguide. In other words, multi-mode interferometric optical waveguide device 1d can cause the light entered through the second single-mode waveguide 21 to be self-imaged in first single-mode waveguide 20 (e.g., first connecting portion 20r), and allow combined light to exit the first single-mode waveguide 20 with low losses.

Embodiment 5

Figure 9:
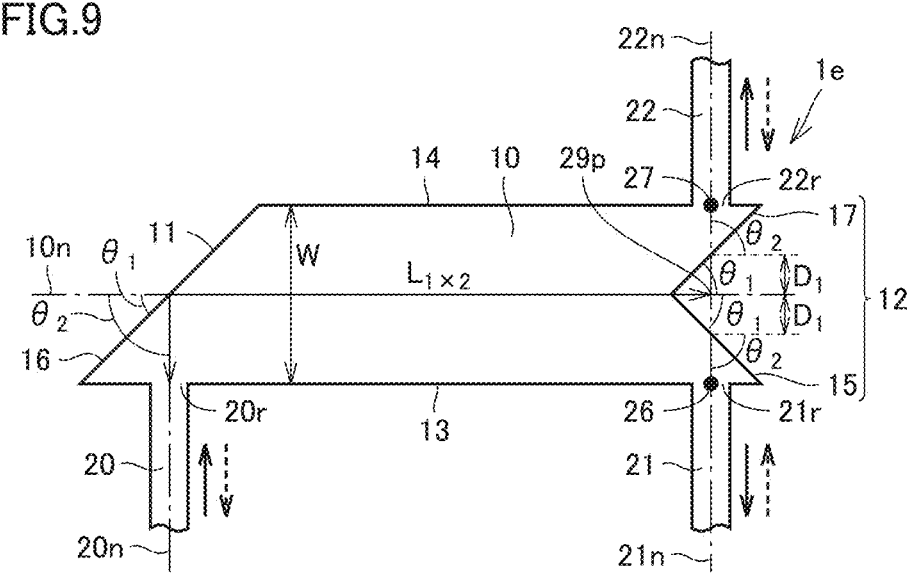
FIG. 9 is a schematic plan view of a multi-mode interferometric optical waveguide device according to Embodiment 5.

Referring to FIG. 9, a multi-mode interferometric optical waveguide device 1e according to Embodiment 5 is now described. Multi-mode interferometric optical waveguide device 1e according to the present embodiment has a configuration similar to multi-mode interferometric optical waveguide device 1d according to Embodiment 4, and mainly differs in the following respect:

In the present embodiment, a first reflective surface 15 is disposed at a first portion of a second end 12 proximal to a first side 13. First reflective surface 15 is inclined with respect to a centerline 10n of multi-mode interferometric optical waveguide 10 in a manner that the distance between a first end 11 and first reflective surface 15 increases toward first side 13 and the distance between first end 11 and first reflective surface 15 decreases toward centerline 10n of multi-mode interferometric optical waveguide 10.

The reflective portion of multi-mode interferometric optical waveguide 10 further includes a third reflective surface 17. Third reflective surface 17 is disposed at a second portion of second end 12 proximal to a second side 14. Third reflective surface 17 is inclined by a first angle $\theta_1$ with respect to centerline 10n of multi-mode interferometric optical waveguide 10, in a direction opposite the first reflective surface 15. First reflective surface 15 and third reflective surface 17 according to the present embodiment correspond to first reflective surface 15 and second reflective surface 16, respectively, according to Embodiment 2 (see FIG. 4).

Multi-mode interferometric optical waveguide device 1e further includes a third single-mode waveguide 22. Third single-mode waveguide 22 is connected to multi-mode interferometric optical waveguide 10 at a third connecting portion 22r. Third single-mode waveguide 22 is connected to second side 14. Particularly, third single-mode waveguide 22 is connected to a portion of second side 14 proximal to second end 12. Third single-mode waveguide 22 is opposite the third reflective surface 17. Third single-mode waveguide 22 has a third centerline 22n that is not in parallel with centerline 10n of multi-mode interferometric optical waveguide 10. Third centerline 22n of third single-mode waveguide 22 is inclined by a second angle $\theta_2$ with respect to centerline 10n of multi-mode interferometric optical waveguide 10, in a direction opposite the second single-mode waveguide 21. Third single-mode waveguide 22 according to the present embodiment corresponds to third single-mode waveguide 22 according to Embodiment 2 (see FIG. 4).

Multi-mode interferometric optical waveguide 10 according to the present embodiment is a single-input two-output multi-mode interferometric optical waveguide (1×2 MMI). Multi-mode interferometric optical waveguide 10 is configured to cause first light entered through the first single-mode waveguide 20 to be self-imaged in second single-mode waveguide 21 (e.g., second connecting portion 21r) and third single-mode waveguide 22 (e.g., third connecting portion 22r). A first image forming portion 26 for the first light is located at, for example, second connecting portion 21r, and a second image forming portion 27 for the first light is located at, for example, third connecting portion 22r.

For example, if multi-mode interferometric optical waveguide 10 is a ridged waveguide, a multi-mode waveguide length $L_{1\times2}$ of multi-mode interferometric optical waveguide 10 is given by Equation (2) stated above. One end of the multi-mode waveguide length $L_{1\times2}$ is a point-of-connection 29p between centerline 10n of multi-mode interferometric optical waveguide 10 and a second centerline 21n of second single-mode waveguide 21.

A first distance $D_1$ is given by W/4. First distance $D_1$ is a distance from centerline 10n of multi-mode interferometric optical waveguide 10 to a point of connection between second centerline 21n of second single-mode waveguide 21 and first reflective surface 15. First distance $D_1$ is a distance from centerline 10n of multi-mode interferometric optical waveguide 10 to a point of connection between third centerline 22n of third single-mode waveguide 22 and third reflective surface 17.

Multi-mode interferometric optical waveguide device 1e according to the present embodiment yields the following advantageous effects, in addition to the advantageous effects of multi-mode interferometric optical waveguide device 1d according to Embodiment 4.

Multi-mode interferometric optical waveguide device 1e further includes third single-mode waveguide 22. The reflective portion further includes third reflective surface 17. First reflective surface 15 is disposed at a first portion of second end 12 proximal to first side 13. Third reflective surface 17 is disposed at a second portion of second end 12 proximal to second side 14. Third single-mode waveguide 22 is opposite the third reflective surface 17, and connected to second side 14.

The first light, such as signal light, enters the multi-mode interferometric optical waveguide 10 through first single-mode waveguide 20. Multi-mode interferometric optical waveguide 10 causes the first light to be reflected off of first reflective surface 15, second reflective surface 16, and third reflective surface 17, and self-imaged in second single-mode waveguide 21 (e.g., second connecting portion 21r) and third single-mode waveguide 22 (e.g., third connecting portion 22r). Since first single-mode waveguide 20 is opposite the second reflective surface 16, if the spreading of the first light is small, the first light is reflected off of second reflective surface 16. Since second single-mode waveguide 21 is opposite the first reflective surface 15, if the spreading of the first light is small, the first light is reflected off of first reflective surface 15. Since third single-mode waveguide 22 is opposite the third reflective surface 17, if the spreading of the first light is small, the first light is reflected off of third reflective surface 17. First reflective surface 15, second reflective surface 16, and third reflective surface 17 reflect the first light into second single-mode waveguide 21 and third single-mode waveguide 22, without substantially disturbing the interference of the first light in multi-mode interferometric optical waveguide 10. Consequently, multi-mode interferometric optical waveguide device 1e can change the direction of travel of the first light with low losses, and split the first light.

While the description has been given mainly for the case where first single-mode waveguide 20 serves as an input optical waveguide, second single-mode waveguide 21 and third single-mode waveguide 22 serve as an output optical waveguide, and multi-mode interferometric optical waveguide device 1e serves as a waveguide-type optical demultiplexer, second single-mode waveguide 21 and third single-mode waveguide 22 can serve as an input optical waveguide, first single-mode waveguide 20 can serve as an output optical waveguide, and multi-mode interferometric optical waveguide device 1e can serve as a waveguide-type optical multiplexer. In other words, multi-mode interferometric optical waveguide device 1e can cause the light entered through the second single-mode waveguide 21 and the light entered through the third single-mode waveguide 22 to be self-imaged in first single-mode waveguide 20 (e.g., first connecting portion 20r), and allow combined light to exit the first single-mode waveguide 20 with low losses.

Embodiment 6

Figure 10:
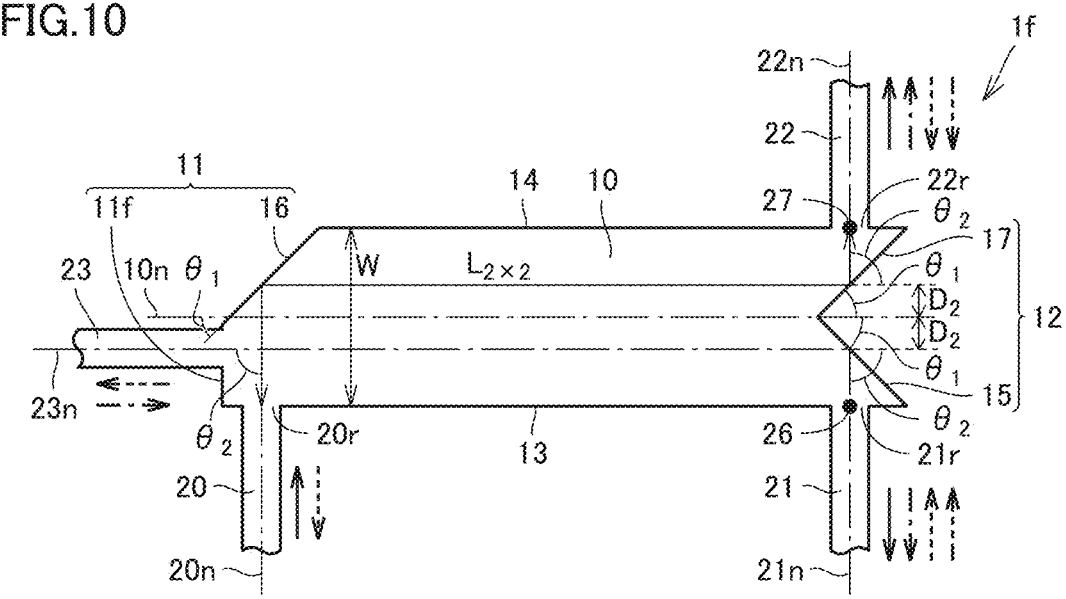
FIG. 10 is a schematic plan view of a multi-mode interferometric optical waveguide device according to Embodiment 6.

Referring to FIG. 10, a multi-mode interferometric optical waveguide device 1f according to Embodiment 6 is now described. Multi-mode interferometric optical waveguide device 1f according to the present embodiment has a configuration similar to multi-mode interferometric optical waveguide device 1e according to Embodiment 5 and mainly differs in the following respect:

In the present embodiment, a third portion 11f of a first end 11 proximal to a first side 13 is perpendicular to a centerline 10n of a multi-mode interferometric optical waveguide 10. A second reflective surface 16 is disposed at a fourth portion of first end 11 proximal to a second side 14. Second reflective surface 16 is inclined with respect to third portion 11f of first end 11.

Multi-mode interferometric optical waveguide device 1f further includes a fourth single-mode waveguide 23. Fourth single-mode waveguide 23 is connected to multi-mode interferometric optical waveguide 10 at a fourth connecting portion 23r. Fourth connecting portion 23r is a boundary between fourth single-mode waveguide 23 and multi-mode interferometric optical waveguide 10. Fourth single-mode waveguide 23 is connected to multi-mode interferometric optical waveguide 10 at third portion 11f of first end 11. A fourth centerline 23n of fourth single-mode waveguide 23 is in parallel with centerline 10n of multi-mode interferometric optical waveguide 10.

Multi-mode interferometric optical waveguide 10 according to the present embodiment is a two-input two-output multi-mode interferometric optical waveguide (2×2 MMI). Multi-mode interferometric optical waveguide 10 is configured to cause first light entered through the first single-mode waveguide 20 to be self-imaged in a second single-mode waveguide 21 (e.g., second connecting portion 21r) and a third single-mode waveguide 22 (e.g., third connecting portion 22r). A first image forming portion 26 for the first light is located at, for example, second connecting portion 21r, and a second image forming portion 27 for the first light is located at, for example, third connecting portion 22r. Multi-mode interferometric optical waveguide 10 is configured to cause second light entered through the fourth single-mode waveguide 23 to be self-imaged in second single-mode waveguide 21 (e.g., second connecting portion 21r) and third single-mode waveguide 22 (e.g., third connecting portion 22r). First image forming portion 26 for the second light is located at, for example, second connecting portion 21r, and second image forming portion 27 for the second light is located at, for example, third connecting portion 22r.

For example, if multi-mode interferometric optical waveguide 10 is a ridged waveguide, a multi-mode waveguide length $L_{2\times2}$ of multi-mode interferometric optical waveguide 10 is given by Equation (3) stated above.

A second distance $D_2$ is given by W/6. Second distance $D_2$ is a distance from centerline 10n of multi-mode interferometric optical waveguide 10 to fourth centerline 23n of fourth single-mode waveguide 23. Second distance $D_2$ is a distance from centerline 10n of multi-mode interferometric optical waveguide 10 to a point of connection between a second centerline 21n of second single-mode waveguide 21 and first reflective surface 15. Second distance $D_2$ is a distance from centerline 10n of multi-mode interferometric optical waveguide 10 to a point of connection between third centerline 22n of third single-mode waveguide 22 and third reflective surface 17.

Multi-mode interferometric optical waveguide device 1f according to the present embodiment has the following advantageous effects, in addition to the advantageous effects of multi-mode interferometric optical waveguide device 1e according to Embodiment 5.

Multi-mode interferometric optical waveguide device 1f further includes fourth single-mode waveguide 23. Fourth single-mode waveguide 23 is connected to third portion 11f of first end 11 proximal to first side 13. Second reflective surface 16 is disposed at a fourth portion of first end 11 proximal to second side 14.

The second light, such as signal light, enters the multi-mode interferometric optical waveguide 10 through fourth single-mode waveguide 23. Multi-mode interferometric optical waveguide 10 causes the second light to be reflected off of first reflective surface 15 and third reflective surface 17, and self-imaged in second single-mode waveguide 21 (e.g., second connecting portion 21r) and third single-mode waveguide 22 (e.g., third connecting portion 22r). Since second single-mode waveguide 21 is opposite the first reflective surface 15, if the spreading of the second light is small, the second light is reflected off of first reflective surface 15. Since third single-mode waveguide 22 is opposite the third reflective surface 17, if the spreading of the second light is small, the second light is reflected off of third reflective surface 17. First reflective surface 15 and third reflective surface 17 reflect the second light into second single-mode waveguide 21 and third single-mode waveguide 22, without substantially disturbing the interference of the second light of multi-mode interferometric optical waveguide 10. Consequently, multi-mode interferometric optical waveguide device 1f can change (e.g., bend 90 degrees) the direction of travel of the second light with low losses, and split the second light.

While the description has been given mainly for the case where first single-mode waveguide 20 or fourth single-mode waveguide 23 serves as an input optical waveguide, second single-mode waveguide 21 and third single-mode waveguide 22 serve as an output optical waveguide, and multi-mode interferometric optical waveguide device 1f serves as a waveguide-type optical demultiplexer, second single-mode waveguide 21 and third single-mode waveguide 22 can serve as an input optical waveguide, first single-mode waveguide 20 or fourth single-mode waveguide 23 can serve as an output optical waveguide, and multi-mode interferometric optical waveguide device 1f can serve as a waveguide-type optical multiplexer.

In other words, if the phase difference between the third light entered through the second single-mode waveguide 21 and the fourth light entered through the third single-mode waveguide 22 is a first phase difference, multi-mode interferometric optical waveguide device 1f can cause the third light and the fourth light to be self-imaged in first single-mode waveguide 20 (e.g., first connecting portion 20r), and allow combined light to exit the first single-mode waveguide 20 with low losses. If the phase difference between the third light entered through the second single-mode waveguide 21 and the fourth light entered through the third single-mode waveguide 22 is a second phase difference (the second phase difference is different from the first phase difference), multi-mode interferometric optical waveguide device 1f can cause the third light and the fourth light to be self-imaged in fourth single-mode waveguide 23 (e.g., fourth connecting portion 23r), and allow combined light to exit the fourth single-mode waveguide 23 with low losses.

Embodiment 7

Figure 11:
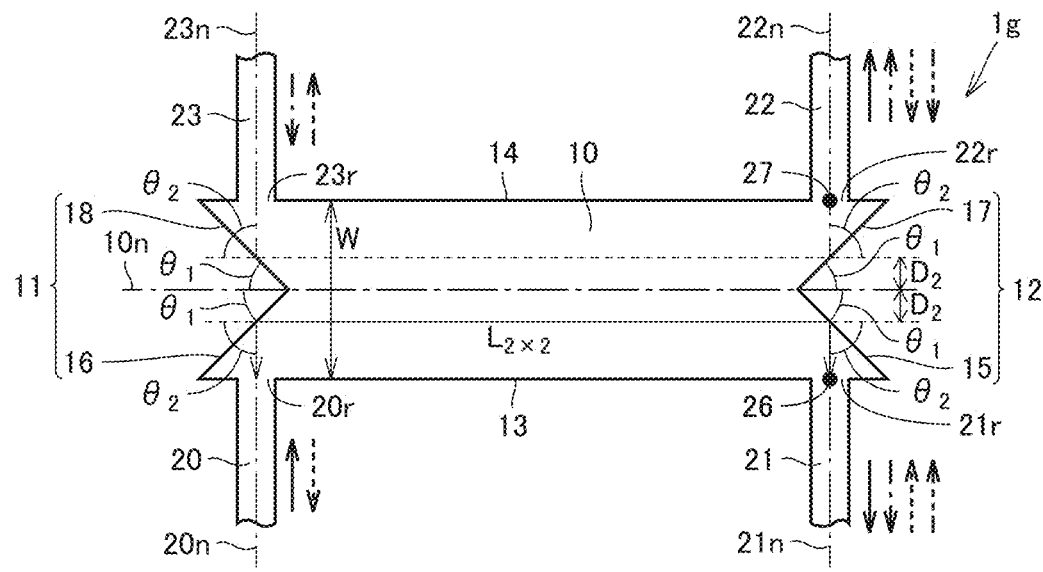
FIG. 11 is a schematic plan view of a multi-mode interferometric optical waveguide device according to Embodiment 7.

Referring to FIG. 11, a multi-mode interferometric optical waveguide device 1g according to Embodiment 7 is now described. Multi-mode interferometric optical waveguide device 1g according to the present embodiment has a configuration similar to multi-mode interferometric optical waveguide device 1e according to Embodiment 5, and mainly differs in the following respect:

In the present embodiment, a second reflective surface 16 is disposed at a third portion of a first end 11 proximal to a first side 13. Second reflective surface 16 is inclined by a first angle $\theta_1$ with respect to a centerline 10n of multi-mode interferometric optical waveguide 10. In one example, first angle $\theta_1$ is 45 degrees. Second reflective surface 16 is inclined with respect to centerline 10n of multi-mode interferometric optical waveguide 10 in a manner that the distance between a second end 12 and second reflective surface 16 increases toward first side 13 and the distance between second end 12 and second reflective surface 16 decreases toward centerline 10n of multi-mode interferometric optical waveguide 10.

The reflective portion of multi-mode interferometric optical waveguide 10 further includes a fourth reflective surface 18. Fourth reflective surface 18 is disposed at a fourth portion of first end 11 proximal to second side 14. Fourth reflective surface 18 is inclined by first angle $\theta_1$ with respect to centerline 10n of multi-mode interferometric optical waveguide 10, in a direction opposite the second reflective surface 16. Fourth reflective surface 18 is inclined with respect to centerline 10n of multi-mode interferometric optical waveguide 10 in a manner that the distance between second end 12 and fourth reflective surface 18 increases toward second side 14 and the distance between second end 12 and fourth reflective surface 18 decreases toward centerline 10n of multi-mode interferometric optical waveguide 10.

Multi-mode interferometric optical waveguide device 1g further includes a fourth single-mode waveguide 23. Fourth single-mode waveguide 23 is connected to multi-mode interferometric optical waveguide 10 at a fourth connecting portion 23r. Fourth connecting portion 23r is a boundary between fourth single-mode waveguide 23 and multi-mode interferometric optical waveguide 10. Fourth single-mode waveguide 23 is connected to second side 14. Particularly, fourth single-mode waveguide 23 is connected to a portion of second side 14 proximal to first end 11. Fourth single-mode waveguide 23 is opposite the fourth reflective surface 18. Fourth single-mode waveguide 23 has a fourth centerline 23n that is not in parallel with centerline 10n of multi-mode interferometric optical waveguide 10. Fourth centerline 23n of fourth single-mode waveguide 23 is inclined by a second angle $\theta_2$ with respect to centerline 10n of multi-mode interferometric optical waveguide 10. Second angle $\theta_2$ is twice the first angle $\theta_1$. In one example, second angle $\theta_2$ is 90 degrees.

Multi-mode interferometric optical waveguide 10 according to the present embodiment is a two-input two-output multi-mode interferometric optical waveguide (2×2 MMI). Multi-mode interferometric optical waveguide 10 is configured to cause first light emitted through the first single-mode waveguide 20 to be self-imaged in second single-mode waveguide 21 (e.g., second connecting portion 21r) and third single-mode waveguide 22 (e.g., third connecting portion 22r). A first image forming portion 26 for the first light is located at, for example, second connecting portion 21r, and a second image forming portion 27 for the first light is located at, for example, third connecting portion 22r. Multi-mode interferometric optical waveguide 10 is configured to cause second light entered through the fourth single-mode waveguide 23 to be self-imaged in second single-mode waveguide 21 (e.g., second connecting portion 21r) and third single-mode waveguide 22 (e.g., third connecting portion 22r). First image forming portion 26 for the second light is located at, for example, second connecting portion 21r, and second image forming portion 27 for the second light is located at, for example, third connecting portion 22r.

For example, if multi-mode interferometric optical waveguide 10 is a ridged waveguide, a multi-mode waveguide length $L_{2 \times 2}$ of multi-mode interferometric optical waveguide 10 is given by Equation (3) stated above.

A second distance $D_2$ is given by W/6. Second distance $D_2$ is a distance from centerline 10n of multi-mode interferometric optical waveguide 10 to a point of connection between first centerline 20n of first single-mode waveguide 20 and second reflective surface 16. Second distance $D_2$ is a distance from centerline 10n of multi-mode interferometric optical waveguide 10 to a point of connection between a second centerline 21n of second single-mode waveguide 21 and first reflective surface 15. Second distance $D_2$ is a distance from centerline 10n of multi-mode interferometric optical waveguide 10 to a point of connection between third centerline 22n of third single-mode waveguide 22 and third reflective surface 17. Second distance $D_2$ is a distance from centerline 10n of multi-mode interferometric optical waveguide 10 to a point of connection between fourth centerline 23n of fourth single-mode waveguide 23 and fourth reflective surface 18.

Multi-mode interferometric optical waveguide device 1g according to the present embodiment has the following advantageous effects, in addition to the advantageous effects of multi-mode interferometric optical waveguide device 1e according to Embodiment 5.

Multi-mode interferometric optical waveguide device 1g further includes fourth single-mode waveguide 23. The reflective portion further includes fourth reflective surface 18. Second reflective surface 16 is disposed at third portion of first end 11 proximal to first side 13. Fourth reflective surface 18 is disposed at a fourth portion of first end 11 proximal to second side 14. Fourth single-mode waveguide 23 is opposite the fourth reflective surface 18, and connected to second side 14.

The second light, such as signal light, enters the multi-mode interferometric optical waveguide 10 through fourth single-mode waveguide 23. Multi-mode interferometric optical waveguide 10 causes the second light to be reflected off of first reflective surface 15, third reflective surface 17, and fourth reflective surface 18, and self-imaged in second single-mode waveguide 21 (e.g., second connecting portion 21r) and third single-mode waveguide 22 (e.g., third connecting portion 22r). Since fourth single-mode waveguide 23 is opposite the fourth reflective surface 18, if the spreading of the second light is small, the second light is reflected off of fourth reflective surface 18. Since second single-mode waveguide 21 is opposite the first reflective surface 15, if the spreading of the second light is small, the second light is reflected off of first reflective surface 15. Since third single-mode waveguide 22 is opposite the third reflective surface 17, if the spreading of the second light is small, the second light is reflected off of third reflective surface 17. First reflective surface 15, third reflective surface 17, and fourth reflective surface 18 reflect the second light into second single-mode waveguide 21 and third single-mode waveguide 22, without substantially disturbing the interference of the second light in multi-mode interferometric optical waveguide 10. Consequently, multi-mode interferometric optical waveguide device 1g can change the direction of travel of the second light with low losses, and split the second light.

While the description has been given mainly for the case where first single-mode waveguide 20 or fourth single-mode waveguide 23 serves as an input optical waveguide, second single-mode waveguide 21 and third single-mode waveguide 22 serve as an output optical waveguide, and multi-mode interferometric optical waveguide device 1g serves as a waveguide-type optical demultiplexer, second single-mode waveguide 21 and third single-mode waveguide 22 can serve as an input optical waveguide, first single-mode waveguide 20 or fourth single-mode waveguide 23 can serve as an output optical waveguide, and multi-mode interferometric optical waveguide device 1g can serve as a waveguide-type optical multiplexer.

In other words, if the phase difference between the third light entered through the second single-mode waveguide 21 and the fourth light entered through the third single-mode waveguide 22 is a first phase difference, multi-mode interferometric optical waveguide device 1g can cause the third light and the fourth light to be self-imaged in first single-mode waveguide 20 (e.g., first connecting portion 20r), and allow combined light to exit the first single-mode waveguide 20 with low losses. If the phase difference between the third light entered through the second single-mode waveguide 21 and the fourth light entered through the third single-mode waveguide 22 is a second phase difference (the second phase difference is different from the first phase difference), multi-mode interferometric optical waveguide device 1g can cause the third light and the fourth light to be self-imaged in fourth single-mode waveguide 23 (e.g., fourth connecting portion 23r), and allow combined light to exit the fourth single-mode waveguide 23 with low losses.

Embodiment 8

Figure 12:
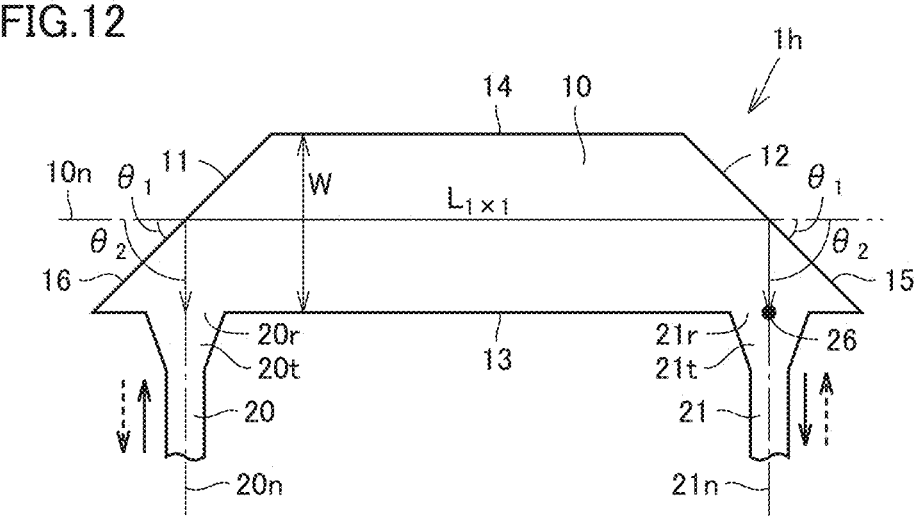
FIG. 12 is a schematic plan view of a multi-mode interferometric optical waveguide device according to Embodiment 8.

Referring to FIG. 12, a multi-mode interferometric optical waveguide device 1h according to Embodiment 8 is now described. Multi-mode interferometric optical waveguide device 1h according to the present embodiment has a configuration similar to multi-mode interferometric optical waveguide device 1d according to Embodiment 4, and mainly differs in the following respect:

In multi-mode interferometric optical waveguide device 1h, at least one of a first single-mode waveguide 20 and a second single-mode waveguide 21 includes tapered waveguide portions 20t, 21t. At tapered waveguide portions 20t, 21t, at least one of first single-mode waveguide 20 and second single-mode waveguide 21 is connected to multi-mode interferometric optical waveguide 10. Tapered waveguide portions 20t, 21t each have a width that gradually increases toward multi-mode interferometric optical waveguide 10.

Figure 13:
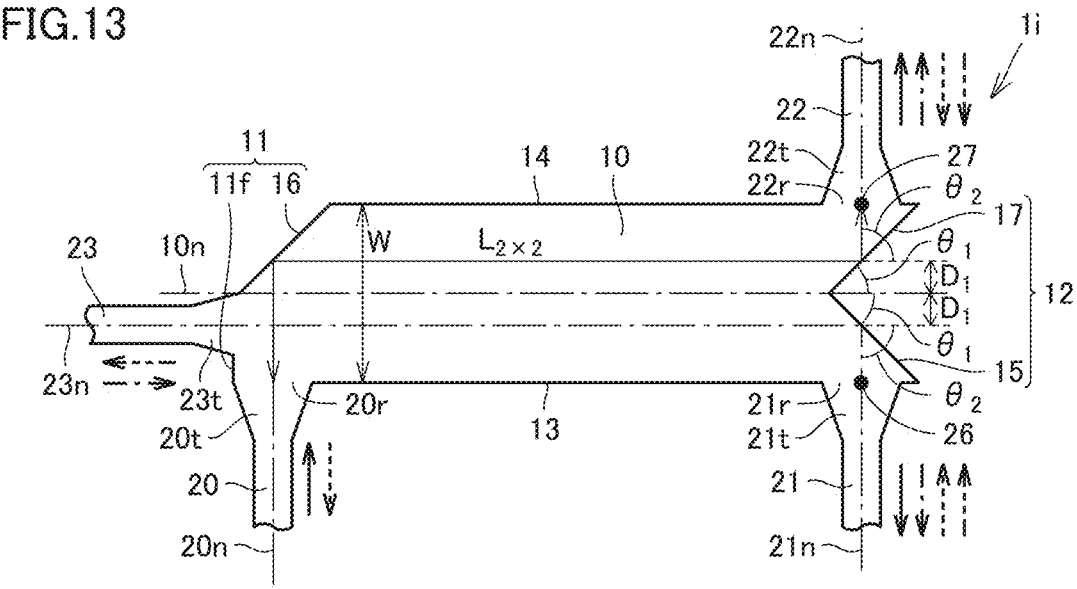
FIG. 13 is a schematic plan view of the multi-mode interferometric optical waveguide device according to a variation of Embodiment 8.

Referring to FIG. 13, a multi-mode interferometric optical waveguide device 1i according to a variation of the present embodiment is now described. Multi-mode interferometric optical waveguide device 1i according to a variation of the present embodiment has a configuration similar to multi-mode interferometric optical waveguide device 1f according to Embodiment 6, and mainly differs in the following respect:

In multi-mode interferometric optical waveguide device 1i, at least one of first single-mode waveguide 20, second single-mode waveguide 21, a third single-mode waveguide 22, and a fourth single-mode waveguide 23 includes a tapered waveguide portion 20t, 21t, 22t, 23t. At tapered waveguide portion 20t, 21t, 22t, 23t, at least one of first single-mode waveguide 20, second single-mode waveguide 21, third single-mode waveguide 22, and fourth single-mode waveguide 23 is connected to multi-mode interferometric optical waveguide 10. Tapered waveguide portion 20t, 21t, 22t, 23t has a width that gradually increases toward multi-mode interferometric optical waveguide 10.

Multi-mode interferometric optical waveguide devices 1h, 1i according to the present embodiment yields the following advantageous effects, in addition to the advantageous effects of multi-mode interferometric optical waveguide devices 1d, 1f according to Embodiments 4 and 6.

In multi-mode interferometric optical waveguide devices 1h, 1i, at least one of first single-mode waveguide 20 and second single-mode waveguide 21 includes tapered waveguide portion 20t, 21t. At tapered waveguide portion 20t, 21t, at least one of first single-mode waveguide 20 and second single-mode waveguide 21 is connected to multi-mode interferometric optical waveguide 10. Tapered waveguide portion 20t, 21t has a width that gradually increases toward multi-mode interferometric optical waveguide 10.

Tapered waveguide portion 20t, 21t can suppress the reflected return light that is caused when light couples from multi-mode interferometric optical waveguide 10 to the at least one of first single-mode waveguide 20 and second single-mode waveguide 21. Multi-mode interferometric optical waveguide devices 1h, 1i can propagate the light with further reduced optical losses.

Embodiment 9

Figure 14:
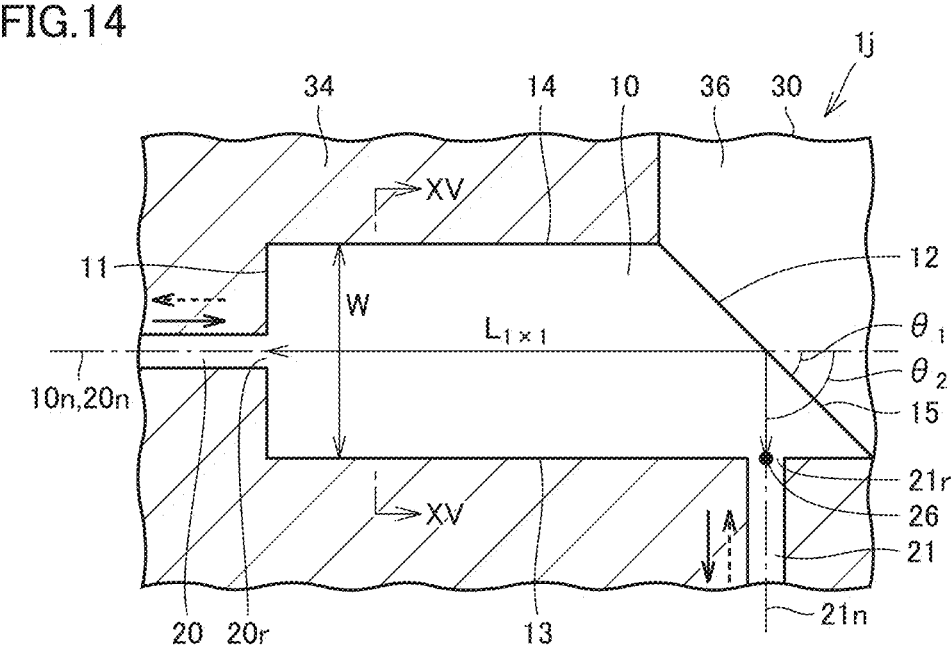
FIG. 14 is a schematic plan view of a multi-mode interferometric optical waveguide device according to Embodiment 9.
Figure 15:
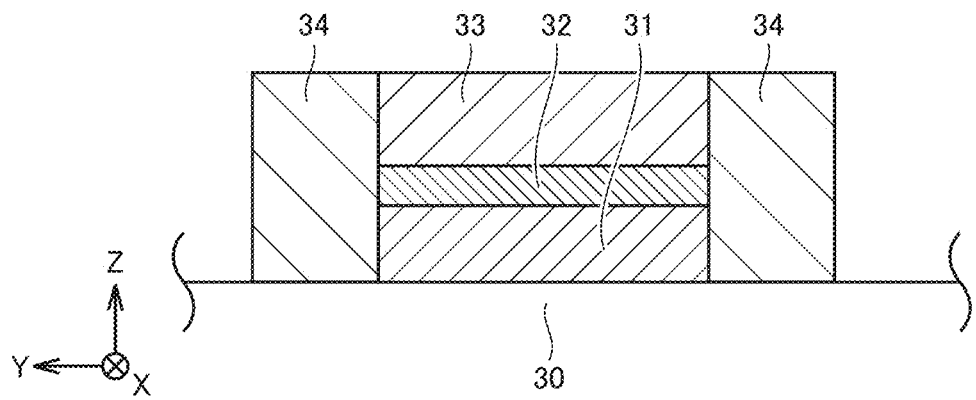
FIG. 15 is an enlarged schematic partial cross-sectional view of the multi-mode interferometric optical waveguide device according to Embodiment 9, taken along section line XV-XV of FIG. 14.

Referring to FIGS. 14 and 15, a multi-mode interferometric optical waveguide device 1j according to Embodiment 9 is now described. Multi-mode interferometric optical waveguide device 1j according to the present embodiment has a configuration similar to multi-mode interferometric optical waveguide device 1 according to Embodiment 1, and mainly differs in the following respect:

Multi-mode interferometric optical waveguide device 1j further includes an embedded layer 34 having a portion of multi-mode interferometric optical waveguide 10 embedded therein. Specifically, embedded layer 34 has first end 11, first side 13, and second side 14 embedded therein. Embedded layer 34 may be formed of the same material as a first clad layer 31 and a second clad layer 33, or different materials from first clad layer 31 and second clad layer 33. Embedded layer 34 is a semiconducting layer, such as an InP layer, for example. A reflective portion (first reflective surface 15) is exposed from embedded layer 34. The reflective portion (first reflective surface 15) is in contact with, for example, an air 36. Embedded layer 34 has a lower refractive index than a core layer 32. A first refractive index difference between multi-mode interferometric optical waveguide 10 (core layer 32) and embedded layer 34 is less than a second refractive index difference between multi-mode interferometric optical waveguide 10 and air 36.

Figure 16:
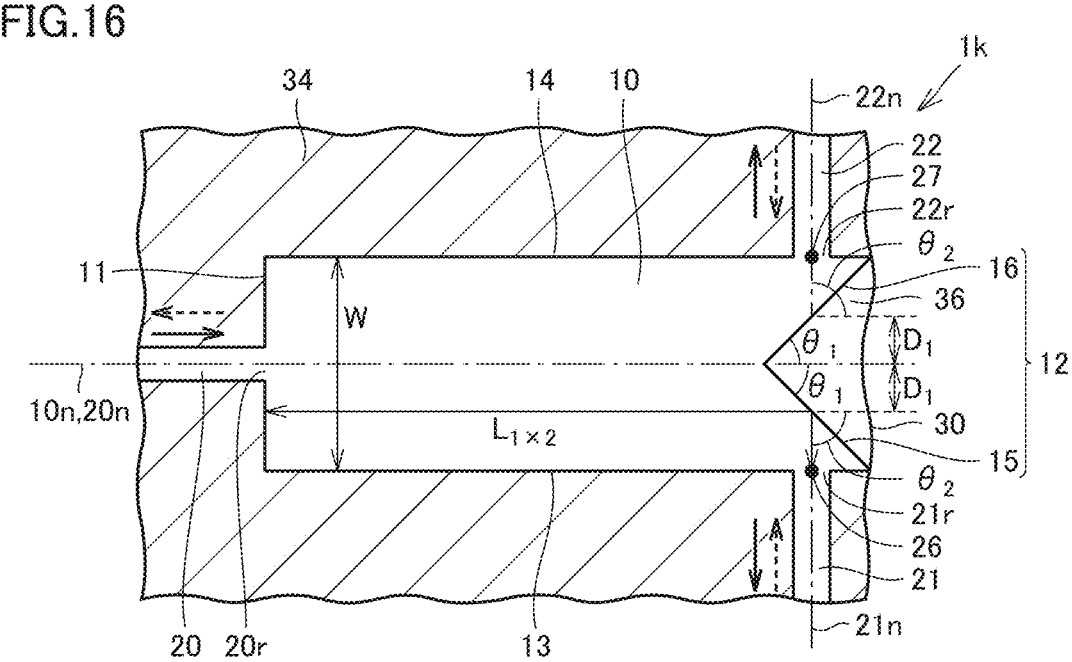
FIG. 16 is a schematic plan view of the multi-mode interferometric optical waveguide device according to Variation 1 of Embodiment 9.

Referring to FIG. 16, a multi-mode interferometric optical waveguide device 1k according to Variation 1 of the present embodiment is now described. Multi-mode interferometric optical waveguide device 1k has a configuration similar to multi-mode interferometric optical waveguide device 1b according to Embodiment 2, except for further including an embedded layer 34. Specifically, embedded layer 34 has first end 11, first side 13, and second side 14 embedded therein. The reflective portions (first reflective surface 15 and second reflective surface 16) are exposed from embedded layer 34. The reflective portions (first reflective surface 15 and second reflective surface 16) are in contact with, for example, air 36.

Figure 17:
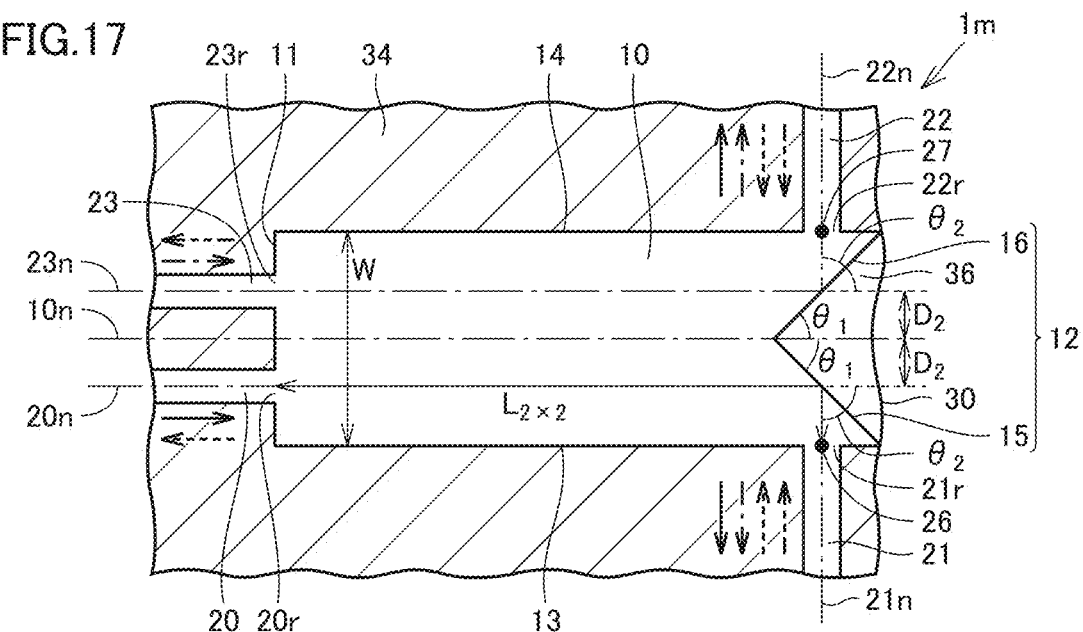
FIG. 17 is a schematic plan view of the multi-mode interferometric optical waveguide device according to Variation 2 of Embodiment 9.

Referring to FIG. 17, a multi-mode interferometric optical waveguide device 1m according to Variation 2 of the present embodiment is now described. Multi-mode interferometric optical waveguide device 1m has a configuration similar to multi-mode interferometric optical waveguide device 1c according to Embodiment 3, except for further including an embedded layer 34. Specifically, embedded layer 34 has first end 11, first side 13, and second side 14 embedded therein. The reflective portions (first reflective surface 15 and second reflective surface 16) are exposed from embedded layer 34. The reflective portions (first reflective surface 15 and second reflective surface 16) are, for example, in contact with air 36.

Multi-mode interferometric optical waveguide devices 1j, 1k, 1m according to the present embodiment yield the following advantageous effects, in addition to the advantageous effects of multi-mode interferometric optical waveguide devices 1, 1b, 1c according to Embodiments 1, 2, and 3.

Multi-mode interferometric optical waveguide devices 1j, 1k, 1m further include an embedded layer 34 having a portion of multi-mode interferometric optical waveguide 10 embedded therein. The reflective portion is exposed from embedded layer 34. A first refractive index difference between multi-mode interferometric optical waveguide 10 (core layer 32) and embedded layer 34 is less than a second refractive index difference between multi-mode interferometric optical waveguide 10 and air 36. Stray light (e.g., the reflected return light of Embodiment 8) in multi-mode interferometric optical waveguide 10 (core layer 32) is sent out to embedded layer 34, and the stray light can thus be eliminated from multi-mode interferometric optical waveguide 10 (core layer 32).

Embodiment 10

Figure 18:
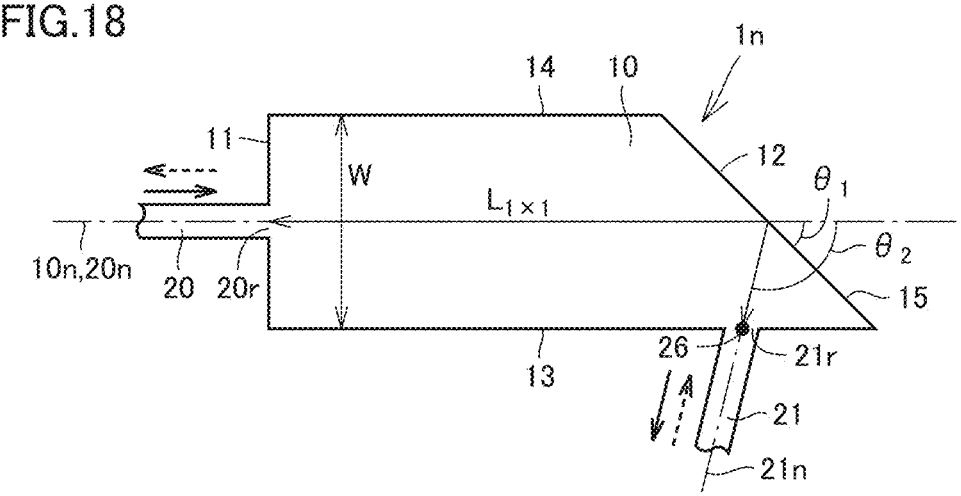
FIG. 18 is a schematic plan view of a multi-mode interferometric optical waveguide device according to Embodiment 10.

Referring to FIG. 18, a multi-mode interferometric optical waveguide device 1n according to Embodiment 10 is now described. Multi-mode interferometric optical waveguide device 1n according to the present embodiment has a configuration and advantageous effects similar to multi-mode interferometric optical waveguide device 1 according to Embodiment 1, and mainly differs in the following respect. A first angle $\theta_1$ is greater than 45 degrees, and a second angle $\theta_2$ is greater than 90 degrees. First angle $\theta_1$ may be greater than 50 degrees, and second angle $\theta_2$ may be greater than 100 degrees. First angle $\theta_1$ may be greater than 60 degrees, and second angle $\theta_2$ may be greater than 120 degrees. Note that, in the present embodiment, second angle $\theta_2$ is substantially twice the first angle $\theta_1$, as with Embodiment 1.

Figure 19:
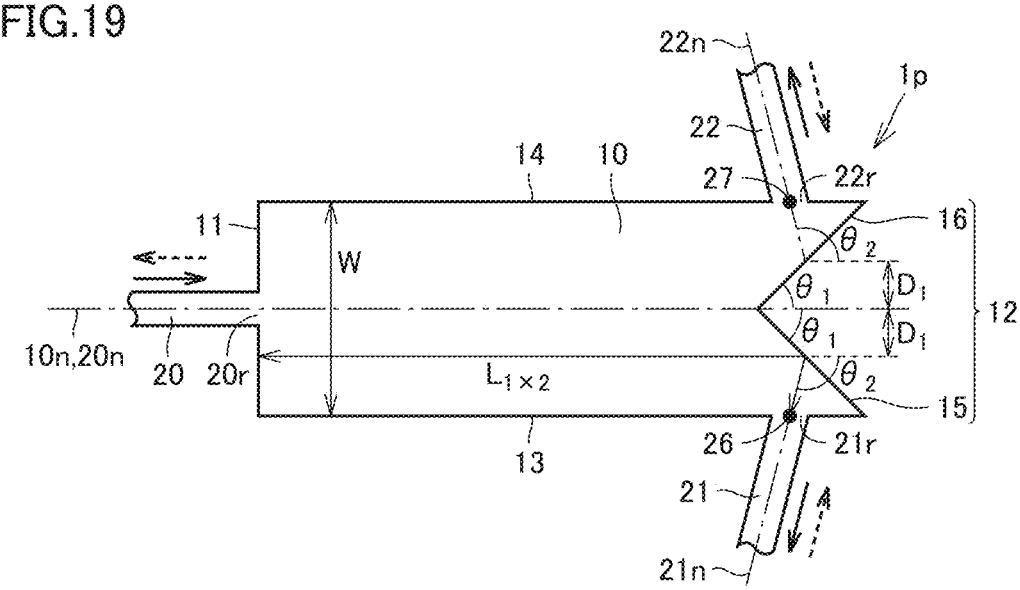
FIG. 19 is a schematic plan view of the multi-mode interferometric optical waveguide device according to a variation of Embodiment 10.

Referring to FIG. 19, a multi-mode interferometric optical waveguide device 1p according to a variation of the present embodiment is now described. Multi-mode interferometric optical waveguide device 1p according to a variation of the present embodiment has a configuration and advantageous effects similar to multi-mode interferometric optical waveguide device 1b according to Embodiment 2, and mainly differs in the following respect. A first angle $\theta_1$ is greater than 45 degrees, and a second angle $\theta_2$ is greater than 90 degrees. First angle $\theta_1$ may be greater than 50 degrees, and second angle $\theta_2$ may be greater than 100 degrees. First angle $\theta_1$ may be greater than 60 degrees, and second angle $\theta_2$ may be greater than 120 degrees. Note that, in the present embodiment, second angle $\theta_2$ is substantially twice the first angle $\theta_1$, as with Embodiment 2.

Note that in another variation of the present embodiment, first angle $\theta_1$ may less than 45 degrees, and second angle $\theta_2$ may be less than 90 degrees. First angle $\theta_1$ may be less than 40 degrees, and second angle $\theta_2$ may be less than 80 degrees. First angle $\theta_1$ may be less than 30 degrees, and second angle $\theta_2$ may be less than 60 degrees.

According to multi-mode interferometric optical waveguide devices 1n, 1p of the present embodiment, the direction of travel of light can be bent in any direction or the light can be split in any direction. Multi-mode interferometric optical waveguide devices 1c, 1d, 1e, 1f, 1g, 1h, 1i according to Embodiments 3 through 9 may be configured in a manner similar to multi-mode interferometric optical waveguide devices 1n, 1p according to the present embodiment.

Embodiment 11

Figure 20:
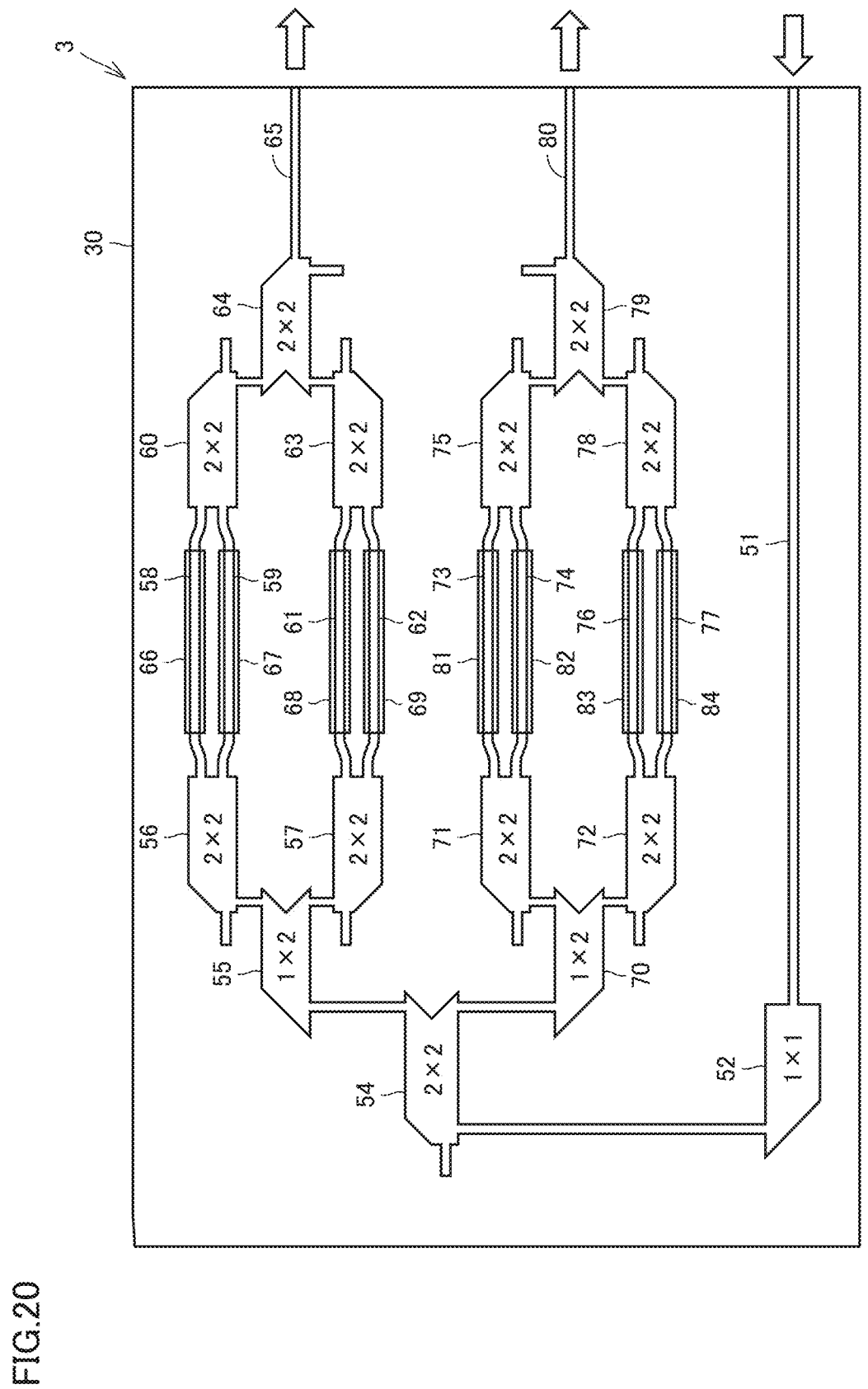
FIG. 20 is a schematic plan view of a photonic integrated circuit according to Embodiment 11.

Referring to FIG. 20, a photonic integrated circuit 3 according to Embodiment 11 is now described. Photonic integrated circuit 3 includes at least one of multi-mode interferometric optical waveguide devices 1, 1b, 1c, 1d, 1e, 1f, 1g, 1h, 1i, 1j, 1k, 1m, 1n, 1p according to Embodiments 1 through 10. Particularly, photonic integrated circuit 3 includes multiple multi-mode interferometric optical waveguide devices, among multi-mode interferometric optical waveguide devices 1, 1b, 1c, 1d, 1e, 1f, 1g, 1h, 1i, 1j, 1k, 1m, 1n, 1p according to Embodiments 1 through 10.

Photonic integrated circuit 3 can serve as a polarization-multiplexing optical phase modulator. Photonic integrated circuit 3 includes an input waveguide 51, multi-mode interferometric optical waveguide devices 52, 54, 55, 56, 57, 60, 63, 64, 70, 71, 72, 75, 78, 79, single-mode waveguides 58, 59, 61, 62, 73, 74, 76, 77, a first output waveguide 65, a second output waveguide 80, and electrodes 66, 67, 68, 69, 81, 82, 83, 84. Input waveguide 51, multi-mode interferometric optical waveguide devices 52, 54, 55, 56, 57, 60, 63, 64, 70, 71, 72, 75, 78, 79, single-mode waveguides 58, 59, 61, 62, 73, 74, 76, 77, first output waveguide 65, second output waveguide 80, and electrodes 66, 67, 68, 69, 81, 82, 83, 84 are formed on the same substrate 30.

Input waveguide 51 is connected to multi-mode interferometric optical waveguide device 52. Multi-mode interferometric optical waveguide device 52 is multi-mode interferometric optical waveguide device 1 according to Embodiment 1. The direction of travel of light entered the photonic integrated circuit 3 through input waveguide 51 is bent 90 degrees by multi-mode interferometric optical waveguide device 52.

Multi-mode interferometric optical waveguide device 52 is connected to multi-mode interferometric optical waveguide device 54. Multi-mode interferometric optical waveguide device 54 is multi-mode interferometric optical waveguide device 1f according to Embodiment 6. Multi-mode interferometric optical waveguide device 54 is connected to multi-mode interferometric optical waveguide device 55 and multi-mode interferometric optical waveguide device 70. The light is split into two by multi-mode interferometric optical waveguide device 54 and output to multi-mode interferometric optical waveguide device 55 and multi-mode interferometric optical waveguide device 70.

Multi-mode interferometric optical waveguide device 55 is multi-mode interferometric optical waveguide device 1e according to Embodiment 5. Multi-mode interferometric optical waveguide device 55 is connected to multi-mode interferometric optical waveguide device 56 and multi-mode interferometric optical waveguide device 57. Light is split into two by multi-mode interferometric optical waveguide device 55 and output to multi-mode interferometric optical waveguide device 56 and multi-mode interferometric optical waveguide device 57.

Multi-mode interferometric optical waveguide device 56 is multi-mode interferometric optical waveguide device if according to Embodiment 6, having first reflective surface 15 and third reflective surface 17 replaced with a flat second end 12 to which second single-mode waveguide 21 and the third single-mode waveguide 22 are connected. Multi-mode interferometric optical waveguide device 56 is a 2×2 multi-mode interferometric optical waveguide device. Multi-mode interferometric optical waveguide device 56 is connected to single-mode waveguide 58 and single-mode waveguide 59. Light is split into two by multi-mode interferometric optical waveguide device 56 and output to single-mode waveguides 58, 59. Single-mode waveguides 58, 59 are connected to multi-mode interferometric optical waveguide device 60. The light transmitted through single-mode waveguide 58 and the light transmitted through single-mode waveguide 59 are multiplexed by multi-mode interferometric optical waveguide device 60. Multi-mode interferometric optical waveguide device 60 is configured in a manner similar to multi-mode interferometric optical waveguide device 56.

Electrode 66 is disposed on single-mode waveguide 58. Electrode 67 is disposed on single-mode waveguide 59. A voltage is applied between electrodes 66, 67 to change the refractive indexes of single-mode waveguides 58, 59. Multi-mode interferometric optical waveguide device 56, 60, single-mode waveguides 58, 59, and electrodes 66, 67 form a first Mach-Zehnder optical modulator.

Multi-mode interferometric optical waveguide device 57 is configured in a manner similar to multi-mode interferometric optical waveguide device 56. Multi-mode interferometric optical waveguide device 57 is connected to single-mode waveguide 61 and single-mode waveguide 62. Light is split into two by multi-mode interferometric optical waveguide device 57 and output to single-mode waveguides 61, 62. Single-mode waveguides 61, 62 are connected to multi-mode interferometric optical waveguide device 63. The light transmitted through single-mode waveguide 61 and the light transmitted through single-mode waveguide 62 are multiplexed by multi-mode interferometric optical waveguide device 63. Multi-mode interferometric optical waveguide device 63 is configured in a manner similar to multi-mode interferometric optical waveguide device 63.

Electrode 68 is disposed on single-mode waveguide 61. Electrode 69 is disposed on single-mode waveguide 62. A voltage is applied between electrodes 68, 69 to change the refractive indexes of single-mode waveguides 61, 62. Multi-mode interferometric optical waveguide devices 57, 63, single-mode waveguides 61, 62, and electrodes 68, 69 form a second Mach-Zehnder optical modulator.

Multi-mode interferometric optical waveguide device 64 is multi-mode interferometric optical waveguide device 1f according to Embodiment 6. Multi-mode interferometric optical waveguide device 64 is connected to multi-mode interferometric optical waveguide device 60 and multi-mode interferometric optical waveguide device 63. The light transmitted through multi-mode interferometric optical waveguide device 60 and the light transmitted through multi-mode interferometric optical waveguide device 63 are multiplexed by multi-mode interferometric optical waveguide device 64, and output to first output waveguide 65.

Multi-mode interferometric optical waveguide device 70 is configured in a manner similar to multi-mode interferometric optical waveguide device 55. Multi-mode interferometric optical waveguide device 70 is connected to multi-mode interferometric optical waveguide device 71 and multi-mode interferometric optical waveguide device 72. Light is split into two by multi-mode interferometric optical waveguide device 70 and output to multi-mode interferometric optical waveguide device 71 and multi-mode interferometric optical waveguide device 72.

Multi-mode interferometric optical waveguide device 71 is configured in a manner similar to multi-mode interferometric optical waveguide device 56. Multi-mode interferometric optical waveguide device 71 is connected to single-mode waveguide 73 and single-mode waveguide 74. The light is split into two by multi-mode interferometric optical waveguide device 71, and output to single-mode waveguides 73, 74. Single-mode waveguides 73, 74 are connected to multi-mode interferometric optical waveguide device 75. The light transmitted through single-mode waveguide 73 and the light transmitted through single-mode waveguide 74 are multiplexed by multi-mode interferometric optical waveguide device 75. Multi-mode interferometric optical waveguide device 75 is configured in a manner similar to multi-mode interferometric optical waveguide device 60.

Electrode 81 is disposed on single-mode waveguide 73. Electrode 82 is disposed on single-mode waveguide 74. A voltage is applied between electrodes 81, 82 to change the refractive indexes of single-mode waveguides 73, 74. Multi-mode interferometric optical waveguide devices 71, 75, single-mode waveguides 73, 74, and electrodes 81, 82 form a third Mach-Zehnder optical modulator.

Multi-mode interferometric optical waveguide device 72 is configured in a manner similar to multi-mode interferometric optical waveguide device 57. Multi-mode interferometric optical waveguide device 72 is connected to single-mode waveguide 76 and single-mode waveguide 77. Light is split into two by multi-mode interferometric optical waveguide device 72 and output to single-mode waveguides 76, 77. Single-mode waveguides 76, 77 are connected to multi-mode interferometric optical waveguide device 78. The light transmitted through single-mode waveguide 76 and the light transmitted through single-mode waveguide 77 are multiplexed by multi-mode interferometric optical waveguide device 78. Multi-mode interferometric optical waveguide device 78 is configured in a manner similar to multi-mode interferometric optical waveguide device 63.

Electrode 83 is disposed on single-mode waveguide 76. Electrode 84 is disposed on single-mode waveguide 77. A voltage is applied between electrodes 83, 84 to change the refractive indexed of single-mode waveguides 76, 77. Multi-mode interferometric optical waveguide devices 72, 78, single-mode waveguides 76, 77, and electrodes 83, 84 form a fourth Mach-Zehnder optical modulator.

Multi-mode interferometric optical waveguide device 79 is configured in a manner similar to multi-mode interferometric optical waveguide device 64. Multi-mode interferometric optical waveguide device 79 is connected to multi-mode interferometric optical waveguide device 75 and multi-mode interferometric optical waveguide device 78. The light transmitted through multi-mode interferometric optical waveguide device 75 and the light transmitted through multi-mode interferometric optical waveguide device 78 are multiplexed by multi-mode interferometric optical waveguide device 79, and output to second output waveguide 80.

Advantageous effects of photonic integrated circuit 3 according to the present embodiment are now described. Photonic integrated circuit 3 includes at least one of the multi-mode interferometric optical waveguide devices according to Embodiments 1 through 10. Consequently, photonic integrated circuit 3 yields the advantageous effects of any of the multi-mode interferometric optical waveguide devices according to Embodiments 1 through 10.

Moreover, in photonic integrated circuit 3, the direction of travel of light is bent by multi-mode interferometric optical waveguide device 52 and multi-mode interferometric optical waveguide device 54. Consequently, photonic integrated circuit 3 according to the present embodiment has a reduced length in the longitudinal direction, resulting in achieving size reduction, as compared to the photonic integrated circuit according to Comparative Example. The photonic integrated circuit according to Comparative Example is configured to use a curved waveguide to bend the direction of travel of light. The photonic integrated circuit according to Comparative Example at least has a size that is defined by the radius of curvature of the curved waveguide.

Furthermore, in photonic integrated circuit 3, multi-mode interferometric optical waveguide 10 included in a first multi-mode interferometric optical waveguide device has the sides connected to the sides of multi-mode interferometric optical waveguide 10 included in a second multi-mode interferometric optical waveguide device adjacent to the first multi-mode interferometric optical waveguide device, via the single-mode waveguides. Consequently, photonic integrated circuit 3 can have a reduced length in the longitudinal direction, resulting in achieving further size reduction, as compared to the case where a longitudinal end of multi-mode interferometric optical waveguide 10, included in the first multi-mode interferometric optical waveguide device, is connected, via the single-mode waveguides, to a longitudinal end of multi-mode interferometric optical waveguide 10, included in the second multi-mode interferometric optical waveguide device adjacent to the first multi-mode interferometric optical waveguide device.

Embodiment 12

Figure 21:
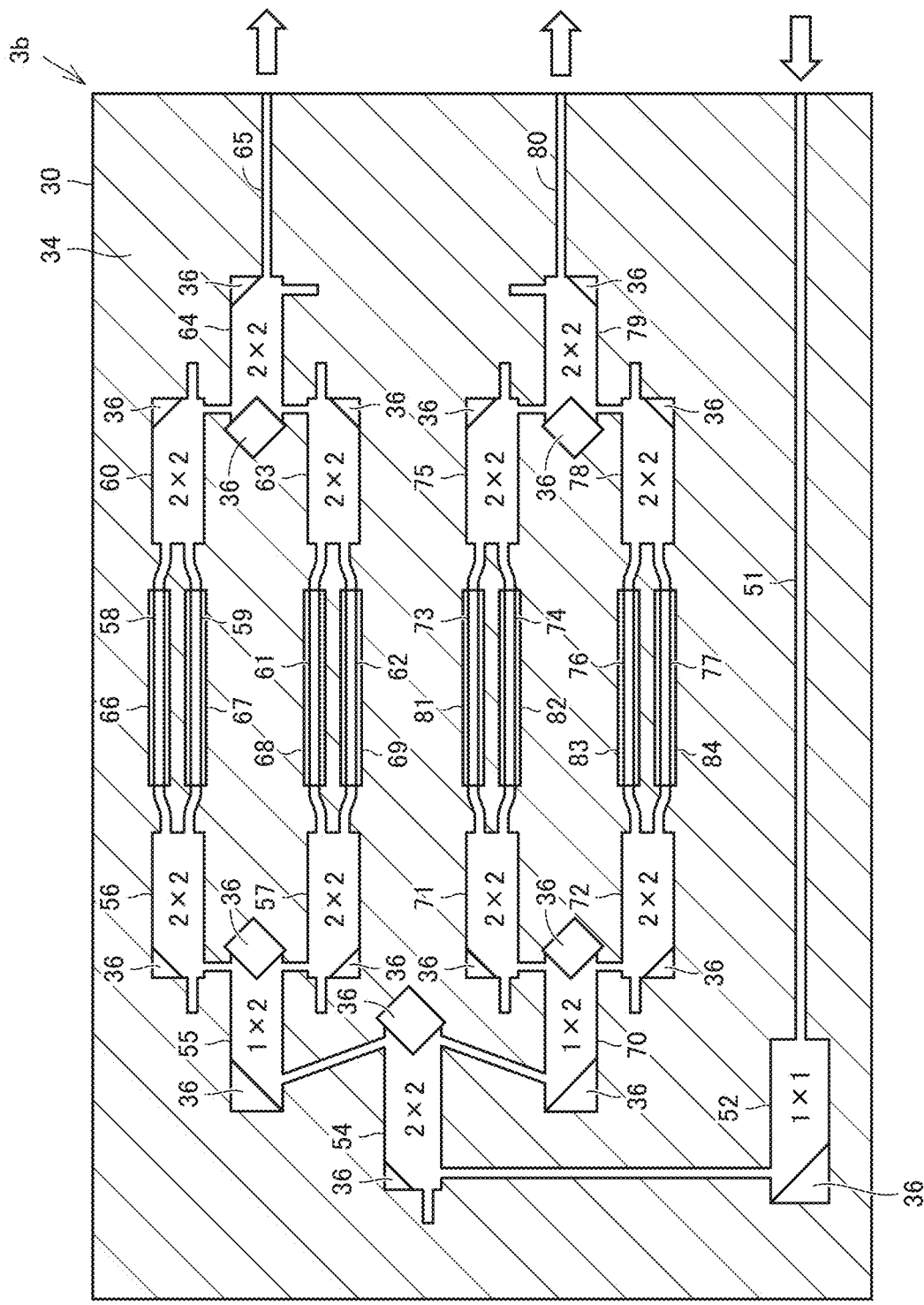
FIG. 21 is a schematic plan view of a photonic integrated circuit according to Embodiment 12.

Referring to FIG. 21, a photonic integrated circuit 3b according to Embodiment 12 is now described. Photonic integrated circuit 3b according to the present embodiment has a configuration and advantageous effects similar to photonic integrated circuit 3 according to Embodiment 11, and mainly differs in the following respect:

Photonic integrated circuit 3b further includes an embedded layer 34 having a portion of a multi-mode interferometric optical waveguide 10 embedded therein, as with multi-mode interferometric optical waveguide devices 1j, 1k, 1m according to Embodiment 9. Specifically, embedded layer 34 has a first end 11, a first side 13, and a second side 14 of multi-mode interferometric optical waveguide 10 embedded therein. The reflective portion (e.g., first reflective surface 15) of multi-mode interferometric optical waveguide 10 is exposed from embedded layer 34. A first refractive index difference between multi-mode interferometric optical waveguide 10 (core layer 32) and embedded layer 34 is less than a second refractive index difference between multi-mode interferometric optical waveguide 10 and an air 36. Stray light (e.g., the reflected return light described in Embodiment 8) in multi-mode interferometric optical waveguide 10 (core layer 32) is sent out to embedded layer 34, and the stray light can thus be eliminated from multi-mode interferometric optical waveguide 10 (core layer 32).

According to multi-mode interferometric optical waveguide device 54 of the present embodiment, a first angle $\theta_1$ is greater than 45 degrees, and a second angle $\theta_2$ is greater than 90 degrees, as with multi-mode interferometric optical waveguide devices 1n, 1p according to Embodiment 10. Consequently, photonic integrated circuit 3b can have a further reduced length in the longitudinal direction. Photonic integrated circuit 3b can achieve a further size reduction.

Embodiment 13

Figure 22:
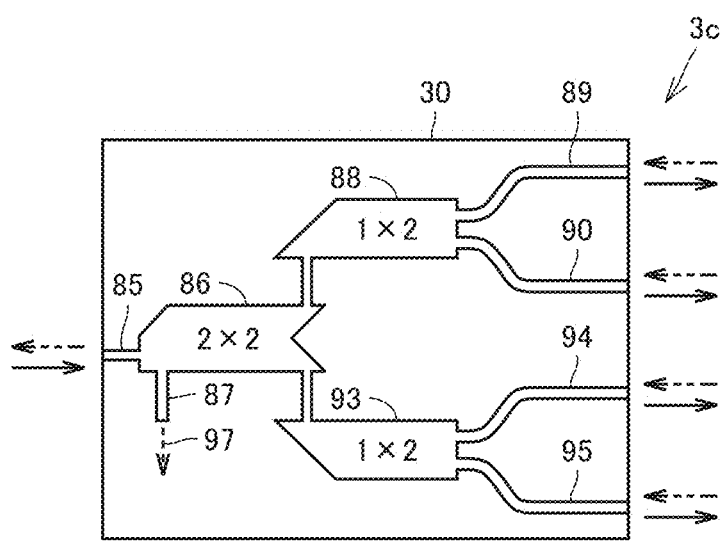
FIG. 22 is a schematic plan view of a photonic integrated circuit according to Embodiment 13.

Referring to FIG. 22, a photonic integrated circuit 3c according to Embodiment 13 is now described. Photonic integrated circuit 3c includes at least one of multi-mode interferometric optical waveguide devices 1, 1b, 1c, 1d, 1e, 1f, 1g, 1h, 1i, 1j, 1k, 1m, 1n, 1p according to Embodiments 1 through 10.

Photonic integrated circuit 3c can server as a one-input four-output waveguide-type optical demultiplexer (a 1×4 waveguide-type optical demultiplexer). Photonic integrated circuit 3c includes single-mode waveguides 85, 89, 90, 94, 95, and multi-mode interferometric optical waveguide devices 86, 88, 93. Single-mode waveguides 85, 89, 90, 94, 95 and multi-mode interferometric optical waveguide devices 86, 88, 93 are formed on the same substrate 30.

Single-mode waveguide 85 is connected to multi-mode interferometric optical waveguide device 86. Multi-mode interferometric optical waveguide device 86 is multi-mode interferometric optical waveguide device 1f according to Embodiment 6. Multi-mode interferometric optical waveguide device 86 is connected to multi-mode interferometric optical waveguide device 88 and multi-mode interferometric optical waveguide device 93. Light transmitted through the single-mode waveguide 85 is split into two by multi-mode interferometric optical waveguide device 86, and output to multi-mode interferometric optical waveguide device 88 and multi-mode interferometric optical waveguide device 93. With multi-mode interferometric optical waveguide device 86, stray light 97, such as reflected return light, is sent out of multi-mode interferometric optical waveguide device 86, and eliminated.

Multi-mode interferometric optical waveguide device 88 is multi-mode interferometric optical waveguide device 1e according to Embodiment 5 (see FIG. 9), having first reflective surface 15 and the second reflective surface replaced with a flat second end 12 to which second single-mode waveguide 21 and third single-mode waveguide 22 are connected. Multi-mode interferometric optical waveguide device 88 is a 1×2 multi-mode interferometric optical waveguide device. Multi-mode interferometric optical waveguide device 88 is connected to single-mode waveguides 89, 90. Light is split into two by multi-mode interferometric optical waveguide device 88, and output to single-mode waveguides 89, 90.

Multi-mode interferometric optical waveguide device 93 is configured in a manner similar to multi-mode interferometric optical waveguide device 88. Multi-mode interferometric optical waveguide device 93 is connected to single-mode waveguides 94, 95. Light is split into two by multi-mode interferometric optical waveguide device 93, and output to single-mode waveguides 94, 95. Thus, the light transmitted through the single-mode waveguide 85 exits the photonic integrated circuit 3c through single-mode waveguides 89, 90, 94, 95.

Multi-mode interferometric optical waveguide 10 included in multi-mode interferometric optical waveguide device 86 has the sides connected to a side of multi-mode interferometric optical waveguide 10 included in multi-mode interferometric optical waveguide device 88 and a side of multi-mode interferometric optical waveguide 10 included in multi-mode interferometric optical waveguide device 93, via the single-mode waveguides. Consequently, photonic integrated circuit 3c can have a reduced length in the longitudinal direction, resulting in achieving further size reduction, as compared to the case where a longitudinal side of multi-mode interferometric optical waveguide 10, included in multi-mode interferometric optical waveguide device 86, is connected, via the single-mode waveguides, to a longitudinal side of multi-mode interferometric optical waveguide 10, included in multi-mode interferometric optical waveguide device 88, and a longitudinal side of multi-mode interferometric optical waveguide 10 included in multi-mode interferometric optical waveguide device 93.

While the description has been given mainly for the case where single-mode waveguide 85 serves as an input optical waveguide, single-mode waveguides 89, 90, 94, 95 serve as an output optical waveguide, and photonic integrated circuit 3c serves as a waveguide-type optical demultiplexer, single-mode waveguides 89, 90, 94, 95 can serve as an input optical waveguide, single-mode waveguide 85 can serve as an output optical waveguide, and photonic integrated circuit 3c can serve as a waveguide-type optical multiplexer.

The presently disclosed Embodiments 1 through 13 should be considered in all aspects as illustrative and not restrictive. Unless otherwise indicated herein or clearly contradicted by context, at least two of Embodiments 1 through 13 may be combined. For example, Embodiments 1 through 3, 5, 7, and 9 through 13 may include tapered waveguide portions 20t, 21t, 22t, 23t according to Embodiment 8. Embodiments 4 through 8, 10, 11, and 13 may include embedded layer 34 according to Embodiment 9. The scope of the present invention is indicated by the appended claims, rather than by the above description, and all changes that come within the scope of the claims and the meaning and range of equivalency of the claims are intended to be embraced within their scope.

REFERENCE SIGNS LIST

1, 1b, 1c, 1d, 1e, 1f, 1g, 1h, 1i, 1j, 1k, 1m, 1n, 1p, 52, 54, 55, 56, 57, 60, 63, 64, 70, 71, 72, 75, 78, 79, 86, 88, 93 multi-mode interferometric optical waveguide device; 3, 3b, 3c photonic integrated circuit; 10 multi-mode interferometric optical waveguide; 10n centerline; 11 first end; 11f third portion; 12 second end; 13 first side; 14 second side; 15 first reflective surface; 16 second reflective surface; third reflective surface; 18 fourth reflective surface; 20 first single-mode waveguide; 20n first centerline; 20r first connecting portion; 20t, 21t, 22t, 23t tapered waveguide portion; 21 second single-mode waveguide; 21n second centerline; 21r second connecting portion; 22 third single-mode waveguide; 22n third centerline; 22r third connecting portion; 23 fourth single-mode waveguide; 23n fourth centerline; 23r fourth connecting portion; 26 first image forming portion; 27 second image forming portion; 29p point of connection; 30 substrate; first clad layer; 32 core layer; 33 second clad layer; 34 embedded layer; 36 air; 51 input waveguide; 58, 59, 61, 62, 73, 74, 76, 77, 85, 87, 89, 90, 94, 95 single-mode waveguide; 65 first output waveguide; 66, 67, 68, 69, 81, 82, 83, 84 electrode; 80 second output waveguide; and 97 stray light.

The invention claimed is:

1. A multi-mode interferometric optical waveguide device, comprising:
a multi-mode interferometric optical waveguide which includes a reflective portion;
a first single-mode waveguide; and
a second single-mode waveguide, wherein
the reflective portion includes a first reflective surface,
the multi-mode interferometric optical waveguide is a 1×1 multi-mode interferometric optical waveguide,
the multi-mode interferometric optical waveguide has a first end, a second end opposite the first end, a first side connecting the first end and the second end, and a second side opposite the first side, the second side connecting the first end and the second end,
the first single-mode waveguide is connected to the first end,
the first reflective surface is disposed at the second end,
the second single-mode waveguide is opposite the first reflective surface, and connected to the first side at a connecting portion, and
when light enters the first single-mode waveguide, the light is self-imaged in the connecting portion.

2. A multi-mode interferometric optical waveguide device, comprising:
a multi-mode interferometric optical waveguide which includes a reflective portion;
a first single-mode waveguide;
a second single-mode waveguide;
a third single-mode waveguide;
the reflective portion includes a first reflective surface and a second reflective surface,
the multi-mode interferometric optical waveguide has a first end, a second end opposite the first end, a first side connecting the first end and the second end, and a second side opposite the first side, the second side connecting the first end and the second end,
the first single-mode waveguide is connected to the first end,
the first reflective surface is disposed at a first portion of the second end proximal to the first side,
the second reflective surface is disposed at a second portion of the second end proximal to the second side,
the second single-mode waveguide is opposite the first reflective surface, and connected to the first side at a first connection portion,
the third single-mode waveguide is opposite the second reflective surface, and connected to the second side at a second connection portion;
a first image forming portion for light output to the second single-mode waveguide is located at the first connection portion; and
a second image forming portion for light output to the third single-mode waveguide is located at the second connection portion,
wherein when light enters the first single-mode waveguide, the light is self-imaged in the first connection portion and the second connection portion.

3. The multi-mode interferometric optical waveguide device according to claim 2, further comprising
a fourth single-mode waveguide, wherein
the first single-mode waveguide is connected to a third portion of the first end proximal to the first side, and
the fourth single-mode waveguide is connected to a fourth portion of the first end proximal to the second side.

4. A multi-mode interferometric optical waveguide device, comprising:
a multi-mode interferometric optical waveguide which includes a reflective portion,
a first single-mode waveguide, and
a second single-mode waveguide, wherein
the reflective portion includes a first reflective surface and a second reflective surface,
the multi-mode interferometric optical waveguide has a first end, a second end opposite the first end, a first side connecting the first end and the second end, and a second side opposite the first side, the second side connecting the first end and the second end,
the first reflective surface is disposed at the second end,
the second reflective surface is disposed at the first end,
the first single-mode waveguide is connected to the first side, and opposes the second reflective surface, the second single-mode waveguide is connected to the first side at a connection portion, and opposes the first reflective surface; and an image forming portion for light output to the second single-mode waveguide is located at the connection portion, wherein when light enters the first single-mode waveguide, the light is self-imaged in the connection portion.

5. The multi-mode interferometric optical waveguide device according to claim 4, further comprising
a third single-mode waveguide, wherein
the reflective portion further includes a third reflective surface,
the first reflective surface is disposed at a first portion of the second end proximal to the first side,
the third reflective surface is disposed at a second portion of the second end proximal to the second side, and
the third single-mode waveguide is opposite the third reflective surface, and connected to the second side.

6. The multi-mode interferometric optical waveguide device according to claim 5, further comprising
a fourth single-mode waveguide, wherein
the fourth single-mode waveguide is connected to a third portion of the first end proximal to the first side, and
the second reflective surface is disposed at a fourth portion of the first end proximal to the second side.

7. The multi-mode interferometric optical waveguide device according to claim 5, further comprising
a fourth single-mode waveguide, wherein
the reflective portion further includes a fourth reflective surface,
the second reflective surface is disposed at a third portion of the first end proximal to the first side,
the fourth reflective surface is disposed at a fourth portion of the first end proximal to the second side, and
the fourth single-mode waveguide is opposite the fourth reflective surface, and connected to the second side.

8. The multi-mode interferometric optical waveguide device according to claim 1, wherein
at least one of the first single-mode waveguide and the second single-mode waveguide includes a tapered waveguide portion,
at the tapered waveguide portion, the at least one of the first single-mode waveguide and the second single-mode waveguide is connected to the multi-mode interferometric optical waveguide, and
the tapered waveguide portion has a width gradually increasing toward the multi-mode interferometric optical waveguide.

9. The multi-mode interferometric optical waveguide device according to claim 1, further comprising
an embedded layer in which a portion of the multi-mode interferometric optical waveguide is embedded, wherein
the reflective portion is exposed from the embedded layer.

10. The multi-mode interferometric optical waveguide device according to claim 1, wherein
a second angle is substantially twice a first angle,
a centerline of the multi-mode interferometric optical waveguide and the first reflective surface form the first angle, the centerline extending along a longitudinal direction of the multi-mode interferometric optical waveguide, and
the centerline and a second centerline of the second single-mode waveguide form the second angle.

11. A photonic integrated circuit, comprising at least one of the multi-mode interferometric optical waveguide device according to claim 1.

12. The multi-mode interferometric optical waveguide device according to claim 2, wherein
at least one of the first single-mode waveguide and the second single-mode waveguide includes a tapered waveguide portion,
at the tapered waveguide portion, the at least one of the first single-mode waveguide and the second single-mode waveguide is connected to the multi-mode interferometric optical waveguide, and
the tapered waveguide portion has a width gradually increasing toward the multi-mode interferometric optical waveguide.

13. The multi-mode interferometric optical waveguide device according to claim 2, further comprising
an embedded layer in which a portion of the multi-mode interferometric optical waveguide is embedded, wherein the reflective portion is exposed from the embedded layer.

14. The multi-mode interferometric optical waveguide device according to claim 2, wherein
a second angle is substantially twice a first angle,
a centerline of the multi-mode interferometric optical waveguide and the first reflective surface form the first angle, the centerline extending along a longitudinal direction of the multi-mode interferometric optical waveguide, and
the centerline and a second centerline of the second single-mode waveguide form the second angle.

15. A photonic integrated circuit, comprising at least one of the multi-mode interferometric optical waveguide device according to claim 2.

16. The multi-mode interferometric optical waveguide device according to claim 4, wherein
at least one of the first single-mode waveguide and the second single-mode waveguide includes a tapered waveguide portion,
at the tapered waveguide portion, the at least one of the first single-mode waveguide and the second single-mode waveguide is connected to the multi-mode interferometric optical waveguide, and
the tapered waveguide portion has a width gradually increasing toward the multi-mode interferometric optical waveguide.

17. The multi-mode interferometric optical waveguide device according to claim 4, further comprising
an embedded layer in which a portion of the multi-mode interferometric optical waveguide is embedded, wherein
the reflective portion is exposed from the embedded layer.

18. The multi-mode interferometric optical waveguide device according to claim 4, wherein
a second angle is substantially twice a first angle,
a centerline of the multi-mode interferometric optical waveguide and the first reflective surface form the first angle, the centerline extending along a longitudinal direction of the multi-mode interferometric optical waveguide, and
the centerline and a second centerline of the second single-mode waveguide form the second angle.

19. A photonic integrated circuit, comprising at least one of the multi-mode interferometric optical waveguide device according to claim 4.

* * * * *